(12) United States Patent
Pattan et al.

(10) Patent No.: US 11,202,182 B2
(45) Date of Patent: Dec. 14, 2021

(54) SEAL SYSTEM AND METHOD FOR PROVISIONING INTER-SERVICES COMMUNICATION IN SEAL SYSTEM OF WIRELESS COMMUNICATION NETWORK

(71) Applicant: Samsung Electronics Co., Ltd., Suwon-si (KR)

(72) Inventors: Basavaraj Jayawant Pattan, Bangalore (IN); Nishant Gupta, Sitapur (IN); Suresh Chitturi, Bangalore (IN); Karthik Srinivasa Gopalan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 16/683,995

(22) Filed: Nov. 14, 2019

(65) Prior Publication Data

US 2020/0178052 A1 Jun. 4, 2020

(30) Foreign Application Priority Data

Nov. 14, 2018 (IN) .............................. 201841042896
Feb. 16, 2019 (IN) .............................. 201941006186
Nov. 11, 2019 (IN) ............................ 2018 41042896

(51) Int. Cl.
*H04W 4/50* (2018.01)
*H04W 4/40* (2018.01)
(Continued)

(52) U.S. Cl.
CPC ........... *H04W 4/50* (2018.02); *H04L 41/5058* (2013.01); *H04W 4/40* (2018.02); *H04W 80/12* (2013.01)

(58) Field of Classification Search
CPC ......... H04W 4/50; H04W 4/40; H04W 80/12; H04W 4/02; H04W 4/08; H04L 41/5058; H04L 41/5054; H04L 41/5051
See application file for complete search history.

(56) References Cited

U.S. PATENT DOCUMENTS

2009/0217342 A1* 8/2009 Nadler ................... G06F 21/40
726/1
2009/0325620 A1* 12/2009 Brewer ................. H04W 76/45
455/518

(Continued)

FOREIGN PATENT DOCUMENTS

KR 10-2017-0052446 A 5/2017
WO 2016-105981 A1 6/2016

OTHER PUBLICATIONS

3rd Generation Partnership Project; Technical Specification Group Services and System Aspects; Functional architecture and information flows to support Common API Framework for 3GPP Northbound APIs; TS 23.222 V16.2.0 Stage 2, (Release 16); Dec. 2018.

(Continued)

*Primary Examiner* — Charles C Jiang
*Assistant Examiner* — Shawn D Miller
(74) *Attorney, Agent, or Firm* — Jefferson IP Law, LLP

(57) ABSTRACT

A service enabler architecture layer (SEAL) system for a wireless communication network and a method therefor are provided. The SEAL system includes: a SEAL function entity including SEAL service servers corresponding to functionalities associated with service applications, where the SEAL function entity is an intermediate layer between a 3GPP network core and a service application system, and interfaces provided by the SEAL service servers. The SEAL system also provisions inter-services communication in a SEAL system of wireless communication network by receiving a request from a service application system for (Continued)

accessing at least one functionality of a plurality of functionalities, determines at least one functionality of the plurality of functionalities requested by the service application system based on the request, and provides at least one functionality to the service application system based on the inter-services communication in the SEAL system.

16 Claims, 24 Drawing Sheets

(51) Int. Cl.
*H04W 80/12* (2009.01)
*H04L 12/24* (2006.01)

(56) References Cited

U.S. PATENT DOCUMENTS

| | | | | |
|---|---|---|---|---|
| 2013/0263009 | A1* | 10/2013 | Kim | H04L 51/32 |
| | | | | 715/739 |
| 2016/0182433 | A1* | 6/2016 | McDaid | H04L 65/4015 |
| | | | | 709/206 |
| 2017/0052919 | A1* | 2/2017 | Purcell | H05K 7/1438 |
| 2017/0155736 | A1* | 6/2017 | Schukovets | H04L 67/02 |
| 2017/0302751 | A1* | 10/2017 | Yang | H04M 15/8033 |
| 2017/0347283 | A1 | 11/2017 | Kodaypak | |
| 2018/0048579 | A1* | 2/2018 | Svedberg | H04L 43/026 |
| 2018/0191516 | A1* | 7/2018 | Wolfner | H04W 88/04 |
| 2018/0287894 | A1 | 10/2018 | Senarath | |
| 2018/0307550 | A1* | 10/2018 | Parikh | G06F 9/547 |

OTHER PUBLICATIONS

3GPP TS 23.434 V0.1.0; 3rd Generation Partnership Project; Technical Specification Group Services and System Aspects; Service Enabler Architecture Layer for Verticals; Functional architecture and information flows; (Release 16); Jan. 2019. (Version 1).

3GPP TS 23.434 V0.1.0; 3rd Generation Partnership Project; Technical Specification Group Services and System Aspects; Service Enabler Architecture Layer for Verticals; Functional architecture and information flows; (Release 16); Jan. 2019. (Version 2).

International Search Report dated Feb. 25, 2020, issued in an International Application No. PCT/KR2019/015530.

\* cited by examiner

SEAL SYSTEM AND METHOD FOR PROVISIONING INTER-SERVICES COMMUNICATION IN SEAL SYSTEM OF WIRELESS COMMUNICATION NETWORK

CROSS-REFERENCE TO RELATED APPLICATION(S)

This application is based on and claims priority under 35 U.S.C. § 119 of an Indian patent application number 201841042896, filed on Nov. 14, 2018, of an Indian patent application number 201941006186, filed on Feb. 16, 2019, and of an Indian patent application number 201841042896, filed on Nov. 11, 2019, each of which is filed in the Indian Patent Office, the disclosures of each of which is incorporated by reference herein in its entirety.

BACKGROUND

1. Field

The disclosure relates to wireless communication. More particularly, the disclosure relates to a service enabler architecture layer (SEAL) system and a method for provisioning inter-services communication in the SEAL system of wireless communication network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large-scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

Generally, telecom industry mainly serves consumers with mobile communications including call, text, and internet data. However, the telecom industry is fast evolving and ready to offer services to different verticals (such as Public Safety, Automotive, Health, Logistics etc.) based on the demand from the verticals to leverage the telecom network in respective domains. Therefore, the telecom networks now need to support different service delivery characteristics for different kinds of services.

In general, the service verticals when deployed over the telecom network would be disconnected and work in isolation. Multiple of such service verticals would require similar network functionalities. Existing model of isolated service verticals does not allow convergence of the similar network functionalities, which might lead to loss of resources and processing speed especially when there are a large number of service verticals requesting for the services from the telecom networks.

The above information is presented as background information only to assist with an understanding the disclosure. No determination has been made and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method a service enabler architecture layer (SEAL) system and a method for provisioning inter-services communication in the SEAL system of wireless communication network.

Additional aspects will be set forth in part in the description which follows and, in part, will be apparent from the description, or may be learned by practice of the presented embodiments.

In accordance with an aspect of the disclosure, a service enabler architecture layer (SEAL) system for a wireless communication network is provided.

In accordance with another aspect of the disclosure, a method for provisioning inter-services communication in a service enabler architecture layer (SEAL) system of a wireless communication network is provided.

In accordance with another aspect of the disclosure, a SEAL function entity for provisioning inter-services communication in a service enabler architecture layer (SEAL) system of a wireless communication network is provided.

In accordance with another aspect of the disclosure, a method of receiving a request from a service application system for accessing at least one functionality of a plurality of functionalities is provided.

In accordance with another aspect of the disclosure, a method of determining at least one functionality of the plurality of functionalities requested by the service application system based on the request is provided.

In accordance with another aspect of the disclosure, a response by at least one SEAL service server of plurality of SEAL service servers to at least one of the service application system and SEAL client for accessing at least one functionality of plurality of functionalities is provided.

In accordance with another aspect of the disclosure, a SEAL function entity comprising a plurality of SEAL service servers corresponding to a plurality of functionalities is provided.

Accordingly, the embodiments herein provide a service enabler architecture layer (SEAL) system or a SEAL function entity for a wireless communication network. The SEAL system includes a SEAL function entity comprising a plurality of SEAL service servers corresponding to a plurality of functionalities associated with service applications, where the SEAL function entity is an intermediate layer between a 3rd generation partnership project (3GPP) network core and a service application system. The SEAL system also includes a plurality of interfaces provided by the plurality of SEAL service servers, where the plurality of interfaces is one of, a SEAL-S interface, a SEAL-N interface, a SEAL-X interface, a SEAL-UU interface and a SEAL-C interface. The SEAL function entity is connected to at least one of the 3GPP network core or the service application system through the plurality of interfaces provided by the plurality of SEAL service servers.

In an embodiment, the SEAL function entity is connected to the 3GPP network core through the SEAL-S. The 3GPP networks can be one of Evolved Packed System (EPS) and a 5G System (5GS).

In an embodiment, the SEAL function entity is connected to the service application system through a SEAL-N interface.

In an embodiment, the plurality of SEAL service servers comprises at least one of a group management server, a configuration management server, an identity management server, a multimedia broadcast and multicast services (MBMS) server, a group communication server, a security services server, or a location services server.

In an embodiment, a first SEAL service server of the plurality of SEAL service servers receives a request from at least one of a service application system and a SEAL client for accessing at least one functionality of the plurality of functionalities.

In an embodiment, at least one SEAL service server of the plurality of SEAL service servers provides a response to at least one of the service application system and the SEAL client for accessing the at least one functionality of the plurality of functionalities, wherein the response is one of a consolidated response from the plurality of SEAL service servers and a response from a single SEAL service server.

In an embodiment, the first SEAL service server accesses the plurality of functionalities by communicating with at least one another SEAL service server of the plurality of SEAL service servers, wherein the first SEAL service communicates with the at least one second SEAL service server through a SEAL-X interface.

In an embodiment, the SEAL function entity comprises application plane and signaling plane entities that are common across multiple service applications.

In an embodiment, a SEAL client(s) communicates with at least one SEAL service server of the plurality of SEAL service servers 180 over the SEAL-UU interface.

In an embodiment, a SEAL client(s) communicates with VAL client(s) over the SEAL-C interface.

Accordingly, the embodiments herein provide a method for provisioning inter-services communication in a service enabler architecture layer (SEAL) system of a wireless communication network. The method includes receiving, by a SEAL function entity, a request from a service application system for accessing at least one functionality of a plurality of functionalities, where the SEAL function entity comprises the plurality of SEAL service servers corresponding to the plurality of functionalities. The method also includes determining, by the SEAL function entity, at least one functionality of the plurality of functionalities requested by the service application system based on the request, and providing, by the SEAL function entity, at least one functionality to the service application system based on the inter-services communication in the SEAL system.

In an embodiment, the providing the at least one functionality to the service application system 300 based on the inter-services communication of the plurality of SEAL service servers 180 in the SEAL function entity 100 comprises, determining a set of functionalities requested by the service application system 300 based on the request, the set of functionalities corresponding to the plurality of SEAL service servers 180, consolidating the set of functionalities corresponding to the plurality of SEAL service servers 180 based on the request from the service application system 300, and providing a single response to the service application system 300 based on the inter-services communication between a first SEAL service server and at least one second SEAL service server of the plurality of SEAL service servers in the SEAL system 1000.

In an embodiment, the providing the at least one functionality to the service application system based on the inter-services communication in the SEAL system 1000 comprises, determining a set of functionalities requested by the service application system 300, the set of functionalities corresponding to a first SEAL service server of the plurality of SEAL service servers 180, and providing a single response to the service application system 300 based on the set of functionalities corresponding to the first SEAL service server of the plurality of SEAL service servers 180 requested by the service application system 300.

Accordingly, the embodiments herein provide a SEAL function entity for provisioning inter-services communication in a service enabler architecture layer (SEAL) system of a wireless communication network. The SEAL function entity includes a plurality of SEAL service servers corresponding to a plurality of functionalities, a memory, and at least one processor coupled to the memory. The at least one processor is configured to receive a request from a service application system for accessing at least one functionality of a plurality of functionalities, the SEAL function entity comprising the plurality of SEAL service servers corresponding to the plurality of functionalities. The at least one processor is further configured to determine at least one functionality of the plurality of functionalities requested by the service application system based on the request, and provide at least one functionality to the service application system based on the inter-services communication in the SEAL system.

In an embodiment, the at least one processor 160 is further configured to provide the at least one functionality to the service application system 300 based on the inter-services communication in the SEAL system 1000, determine a set of functionalities requested by the service application system 300 based on the request, wherein the set of functionalities corresponds to the plurality of SEAL service servers 180, consolidate the set of functionalities corresponding to the plurality of SEAL service servers 180 based on the request from the service application system 300, and provide a single response to the service application system 300 based on the inter-services communication between a first SEAL service server and at least one second SEAL service server of the plurality of SEAL service servers 180 in the SEAL system 1000.

In an embodiment, the at least one processor 160 is further configured to provide the at least one functionality to the service application system 300 based on the inter-services communication in the SEAL system 1000 comprises, determine a set of functionalities requested by the service application system 300, the set of functionalities corresponding to a first SEAL service server of the plurality of SEAL service servers, and provide a single response to the service application system 300 based on the set of functionalities corresponding to the first SEAL service server of the plurality of SEAL service servers requested by the service application system 300.

Accordingly, the embodiments herein provide a method for provisioning inter-services communication in a service enabler architecture layer (SEAL) system of a wireless communication network. The method includes performing, by the service application system, a service discovery to receive information of multi-service requests and sending, by the service application system, a multi-service request invocation message to a first SEAL service server of a SEAL function entity for performing request invocation. Further, the method includes receiving, by the service application system, a multi-service request invocation response for the request invocation from the first SEAL service server comprising a consolidated response.

In an embodiment, the consolidated response is determined by, receiving, by the first SEAL service server of the SEAL function entity 100, the Multi-service request invocation message, determining, by the first SEAL service server of the SEAL function entity 100, a configuration of access control, wherein a configuration of the access control of the first SEAL service server is used to perform access control on the service request invocation, executing, by the first SEAL service server of the SEAL function entity 100, a multi-service request logic comprising initiating the inter-service communication with at least one second SEAL service server, generating, by the first SEAL service server of the SEAL function entity, the consolidated response from the first SEAL service server and the at least one second SEAL service server of the SEAL function entity 180, and sending, by the first SEAL service server of the SEAL function entity 100, the consolidated response to the service application system 300.

In an embodiment, the inter-service communication is enabled between the first SEAL service server and the at least one of a second SEAL service server of the SEAL function entity 100.

Accordingly, the embodiments herein provide a system for provisioning inter-services communication in a service enabler architecture layer (SEAL) system of a wireless communication network. The system includes a 3GPP network core, a SEAL function entity comprising a plurality of SEAL service servers corresponding to a plurality of functionalities, and a client system requesting to access at least one functionality of the plurality of functionalities.

In an embodiment, the client system is one of a service application system 300, a SEAL client.

In an embodiment, the SEAL function entity 100 is an intermediate layer between the 3GPP network core 200 and the service application system 300.

In an embodiment, the SEAL function entity 100 is connected to the 3GPP network core 200 through a SEAL-S interface and wherein the SEAL function entity 100 is connected to the service application system 300 through a SEAL-N interface.

In an embodiment, the SEAL function entity 100 is connected to the SEAL client through a SEAL-UU interface.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
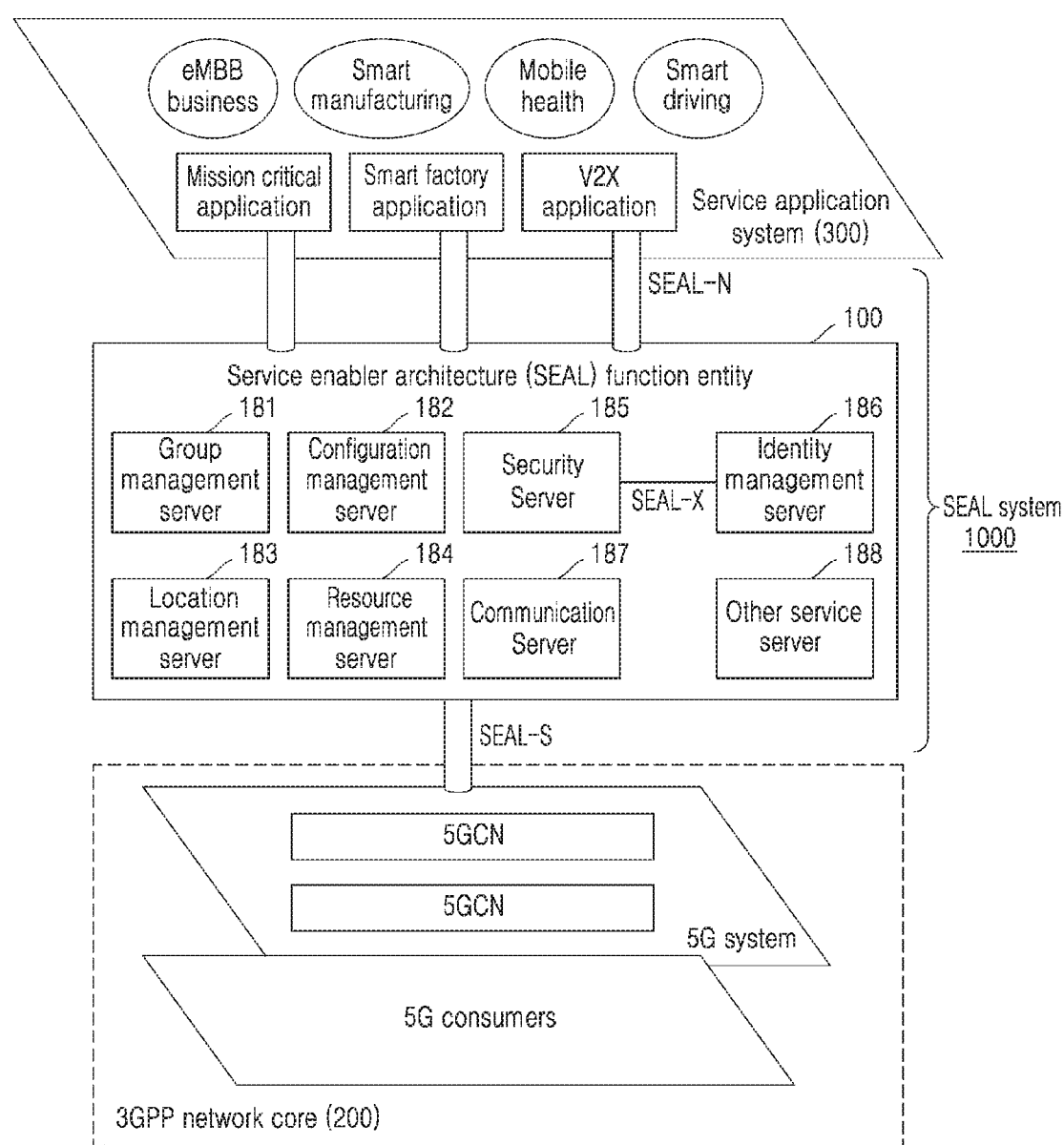
FIG. 1 is a service enabler architecture layer (SEAL) system 1000 integrated with a 5GS network, according to an embodiment of the disclosure.

The following description with reference to the accompanying drawings is provided to assist in a comprehensive understanding of various embodiments of the disclosure as defined by the claims and their equivalents. It includes specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a service enabler architecture layer (SEAL) system for a wireless communication network. The SEAL system includes a SEAL function entity comprising a plurality of SEAL service servers corresponding to a plurality of functionalities associated with service applications, wherein the SEAL function entity is an intermediate layer between a 3GPP network core and a service application system. The SEAL system also provisions inter-services communication in SEAL system of wireless communication network by receiving a request from a service application system for accessing at least one functionality of a plurality of functionalities, determining at least one functionality of the plurality of functionalities requested by the service application system based on the request; and providing at least one functionality to the service application system based on the inter-services communication in the SEAL system.

Unlike the methods and systems of the related art, the proposed method illustrates the service enabler architecture (SEAL) system for service verticals allowing convergence of common functionalities and reuse of the functional entities across the service verticals.

Referring now to the drawings, and more particularly to FIGS. 1 through 21, where similar reference characters denote corresponding features consistently throughout the figures, there are shown preferred embodiments and prior arts for comparison with the preferred embodiments.

FIG. 1 is a service enabler architecture layer (SEAL) system 1000 integrated with a 5GS network, according to an embodiment of the disclosure.

Referring to the FIG. 1, as specified in 3GPP TS 23.434 v0.1.0, the SEAL system 1000 supports the plurality of SEAL services (i.e., Location management, Group management, Configuration management, Identity management and Key management) towards the vertical application layer (VAL). The SEAL system 1000 includes a SEAL function entity 100 which includes a common set of services (e.g. group management, location management) provided by the plurality of SEAL service servers 180 and a plurality of interfaces provided by the plurality of SEAL service servers 180. The plurality of interfaces includes one of a SEAL-S interface, a SEAL-N interface, a SEAL-X interface, a SEAL-UU interface and a SEAL-C interface. The SEAL system 1000 is an intermediate layer between a 3GPP network core 200 and a service application system 300. The SEAL system 1000 possesses corresponding entities on a user equipments (UEs) called SEAL client (s).

The SEAL function entity 100 of the SEAL system 1000 is connected to the 3GPP network core 200 through a 3GPP interface specified by a 3GPP network system and to the service application system 300 through a SEAL-S interface. The 3GPP networks can be one of EPS (Evolved Packed System) and a 5GS (5G System). Further, the SEAL function entity 100 has application plane and signaling plane entities that are common across multiple service applications.

Figure 19:
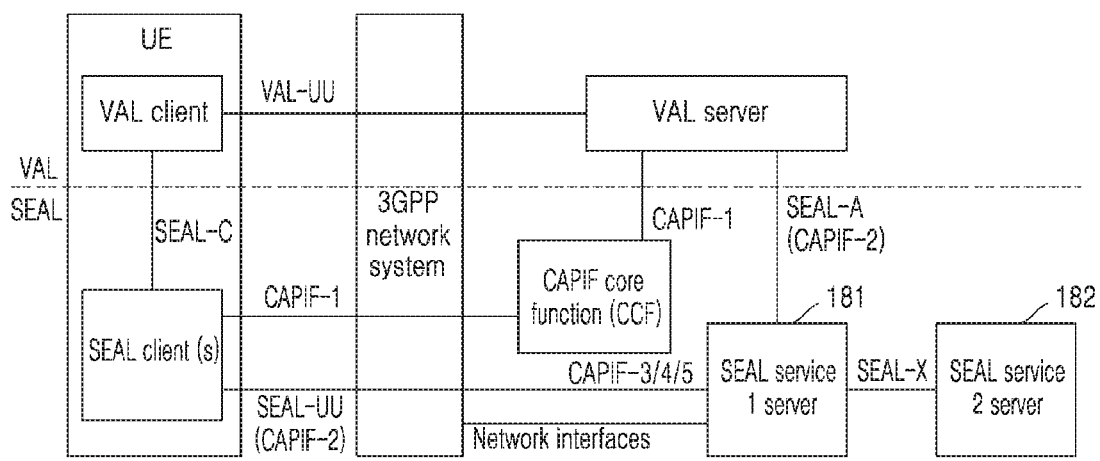
FIG. 19 illustrates architecture of the SEAL system 1000 with the inter-service communication enabled between the plurality of SEAL service servers 180, according to an embodiment of the disclosure.

In a vertical application layer (i.e., the service application system 300), a VAL client communicates with a VAL server over a VAL-UU reference point. The service application system 300 includes an application server for each vertical such as for example Public Safety, Automotive, Health, Logistics etc. The SEAL system 1000 functional entities on a user equipment (UE) and the SEAL system 1000 are grouped into SEAL client(s) and SEAL server(s) respectively. The SEAL system 1000 offers the requested services to the vertical application layer (VAL). The SEAL client(s) communicates with at least one SEAL service server of the plurality of SEAL service servers 180 over a SEAL-UU reference points (as shown in FIG. 19). The SEAL client(s) provides the service enabler layer support functions to the VAL client(s) over SEAL-C reference points (as shown in FIG. 19). The VAL server(s) communicate with the at least one SEAL service server of the plurality of SEAL service servers 180 over a SEAL-S reference points (as shown in FIG. 19). To support distributed SEAL server deployments, the SEAL server interacts with at least one SEAL service server of the plurality of SEAL service servers 180 over a SEAL-X interface (as shown in the FIG. 1 and FIG. 19). The service application system 300 may include at least one service application server. For example, the service application system 300 may include service application server 2400 shown in FIG. 24. Or, the service application system 300 itself may correspond to at least one service application server.

In the SEAL system 1000 integration with the 5GS network, the SEAL function entity 100 utilizes the 3GPP network for obtaining access, thus requiring the SEAL function entity 100 to be integrated with the 3GPP networks. The 3GPP networks can be one of EPS and a 5GS.

Within the application plane the functional the SEAL function entity 100 obtains the 3GPP network access via a SEAL-S interface and the common functions of the SEAL function entity 100 are shared across verticals via SEAL-N interface.

In interface the SEAL-N (between the verticals service provider and the SEAL function entity 100), the SEAL-N interface, which exists between the verticals service provider and the SEAL function entity 100 is used for providing a plurality of functionalities such as group management, configuration management, identity management, group communication, multimedia broadcast and multicast, security and key management, location management, resource management and more functionalities specific to the requirements of the service verticals offered over telecom network.

The SEAL-N interface can be a CAPIF-2/2e compliant interface using a common functional APIs provided by the CAPIF. In such a deployment, the SEAL system 1000 acts as the API exposing function and the CAPIF core function acts as the directory of the service APIs exposed by the SEAL system 1000.

In interface the SEAL-S (between the SEAL system 1000 and the 5GS), the SEAL-S interface which exists between the SEAL system 1000 and the telecom network, is used for: requesting signaling control and media control associated to functionalities offered by the SEAL-N interface.

For example, slice re-selection impacts on resource management: Network slices are generally standardized and pre-configured on the UE by a serving public land mobile network (PLMN). When the UE is successfully registered for a service, selection of slice instance is also confirmed. The set of Network Slices for the UE can be changed at any time while the UE is registered with a network. Based on the knowledge available to an authorized user on the UE, the UE can inform the network (e.g. resource management on the SEAL function entity 100) about the scaling of the network resources requirement of that particular service. Thus, the resource management capability on the SEAL function entity 100 will have the responsibility of interacting with an Availability Management Framework (AMF) entity and ensuring that the scaling of network resources is honored.

Figure 14:
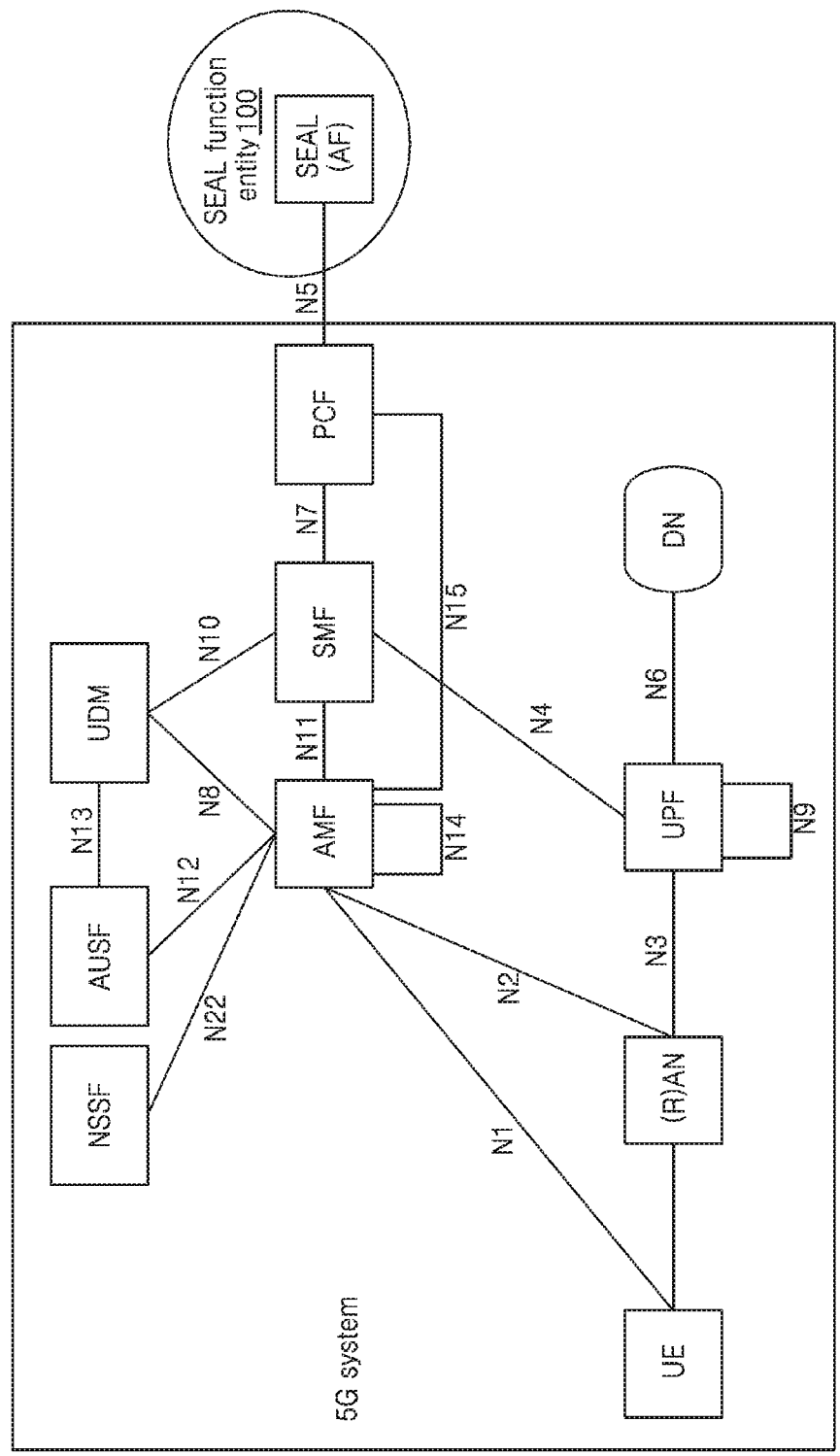
FIG. 14 illustrates a reference-based representation of the SEAL system 1000, according to an embodiment of the disclosure.
Figure 15:
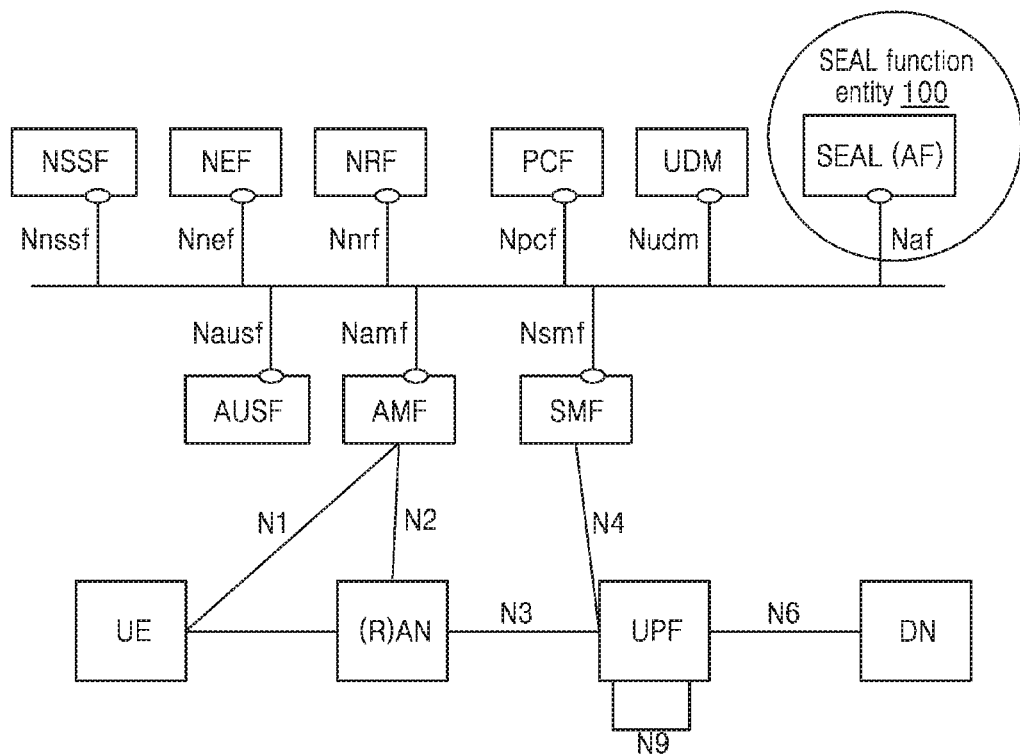
FIG. 15 illustrates a service-based representation of the SEAL system 1000, according to an embodiment of the disclosure.
Figure 16:
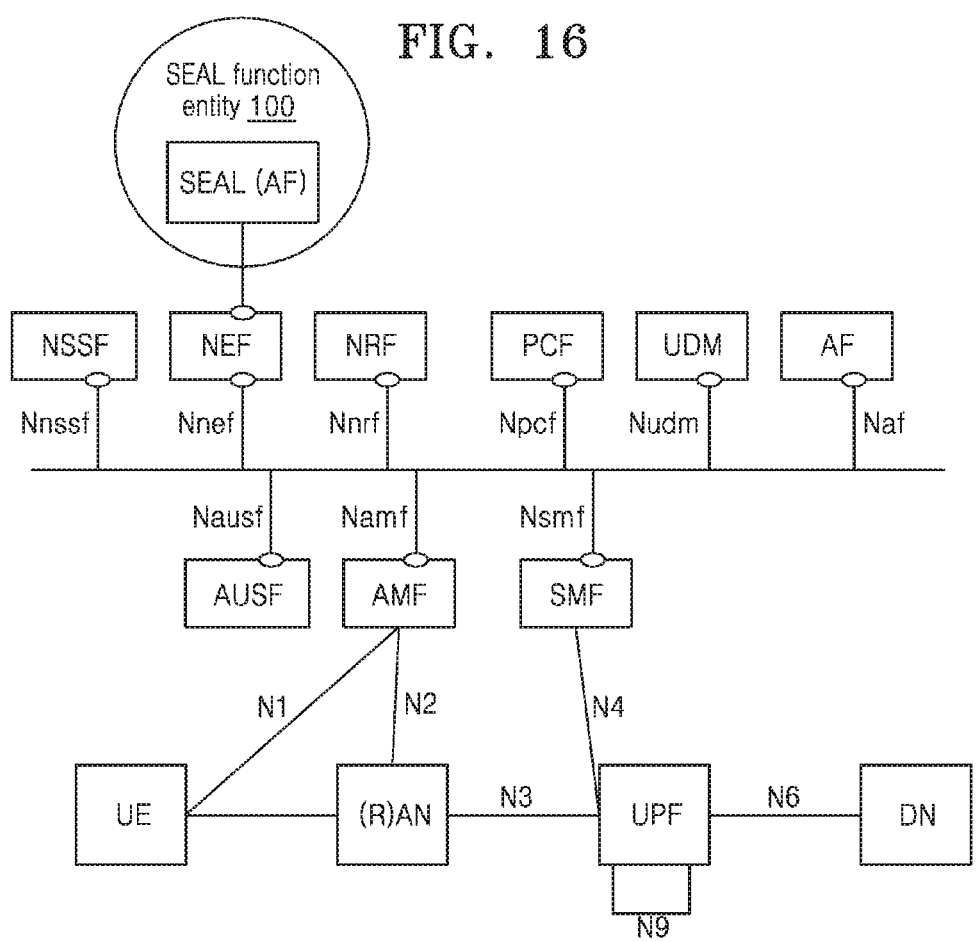
FIG. 16 illustrates an external exposure representation of the SEAL system 1000, according to an embodiment of the disclosure.

The SEAL function entity 100 integration with the 5GS network functions via the SEAL-S interface is represented in three ways as explained with respect to the FIGS. 14-16.

Figure 2:
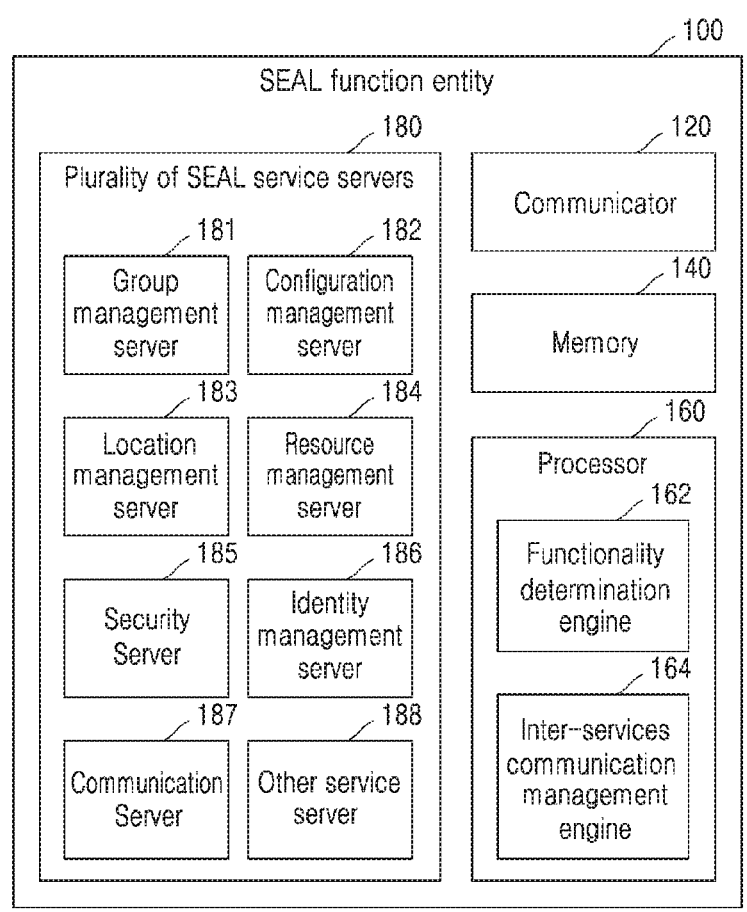
FIG. 2 is a block diagram of the SEAL function entity 100 for provisioning inter-services communication in the SEAL system 1000 of the wireless communication network, according to an embodiment of the disclosure.

FIG. 2 is a block diagram of the SEAL function entity 100 for provisioning inter-services communication in the SEAL system 1000 of the wireless communication network, according to an embodiment of the disclosure.

Referring to the FIG. 2, the SEAL function entity 100 includes a communicator 120, a memory 140, a processor 160 and a plurality of SEAL service servers 180.

In an embodiment, the communicator 120 is configured to receive a request from a service application system 300 for accessing at least one functionality of the plurality of functionalities. The plurality of functionalities is provided by the plurality of SEAL service servers 180. The plurality of SEAL service servers 180 include a group management server 181, a configuration management server 182, a location services server 183, a Resource management server 184, a security services server 185, an identity management server 186, a communication server 187 and other service servers 188.

In another embodiment, the communicator 120 is configured to receive a Multi-service request invocation message. Further, the communicator 120 also sends the consolidated response to the service application system 300.

In an embodiment, the memory 140 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 is configured to store larger amounts of information than the memory. In certain examples, a non-transitory storage medium may store data that can, over time, change (e.g., in Random Access Memory (RAM) or cache).

In an embodiment, the processor 160 includes a functionality determination engine 162 and an inter-services communication management engine 164. The functionality determination engine 162 is configured to determine the at least one functionality of the plurality of functionalities requested by the service application system 300 based on the request.

The functionality determination engine 162 determines that the request is to access the set of functionalities corresponding to the plurality of SEAL service servers 180. Further, the functionality determination engine 162 determines the set of functionalities requested by the service application system 300 based on the request and consolidates the set of functionalities corresponding to the plurality of SEAL service servers 180 based on the request from the service application system 300. Furthermore, the functionality determination engine 162 provides a single response to the service application system 300 based on the inter-services communication between a first SEAL service server and at least one second SEAL service server of the plurality of SEAL service servers 180 in the SEAL function entity 100.

The functionality determination engine 162 determines that the request is to access the set of functionalities corresponding to the first SEAL service server of the plurality of SEAL service servers. Further, the functionality determination engine 162 determines the set of functionalities requested by the service application system 300 based on the request and provides a single response to the service application system 300 based on the set of functionalities corresponding to the first SEAL service server of the plurality of SEAL service servers 180 requested by the service application system 300.

In another embodiment, the functionality determination engine 162 is configured to determine a configuration of access control. A configuration of the access control of the first SEAL service server is used to perform access control on the service request invocation. Further, the functionality determination engine 162 is also configured to execute a multi-service request logic comprising initiating the inter-service communication with at least one second SEAL service server and generate the consolidated response from the first SEAL service server and the at least one second SEAL service server of the SEAL function entity 100.

In an embodiment, the inter-services communication management engine 164 is configured to provide inter-services communication between the plurality of SEAL service servers 180.

Although the FIG. 2 shows the hardware elements of the SEAL function entity 100 but it is to be understood that other embodiments are not limited thereon. In other embodiments, the SEAL function entity 100 may include less or more number of elements. Further, the labels or names of the elements are used only for illustrative purpose and does not limit the scope of the disclosure. One or more components can be combined together to perform same or substantially similar function.

Figure 3:
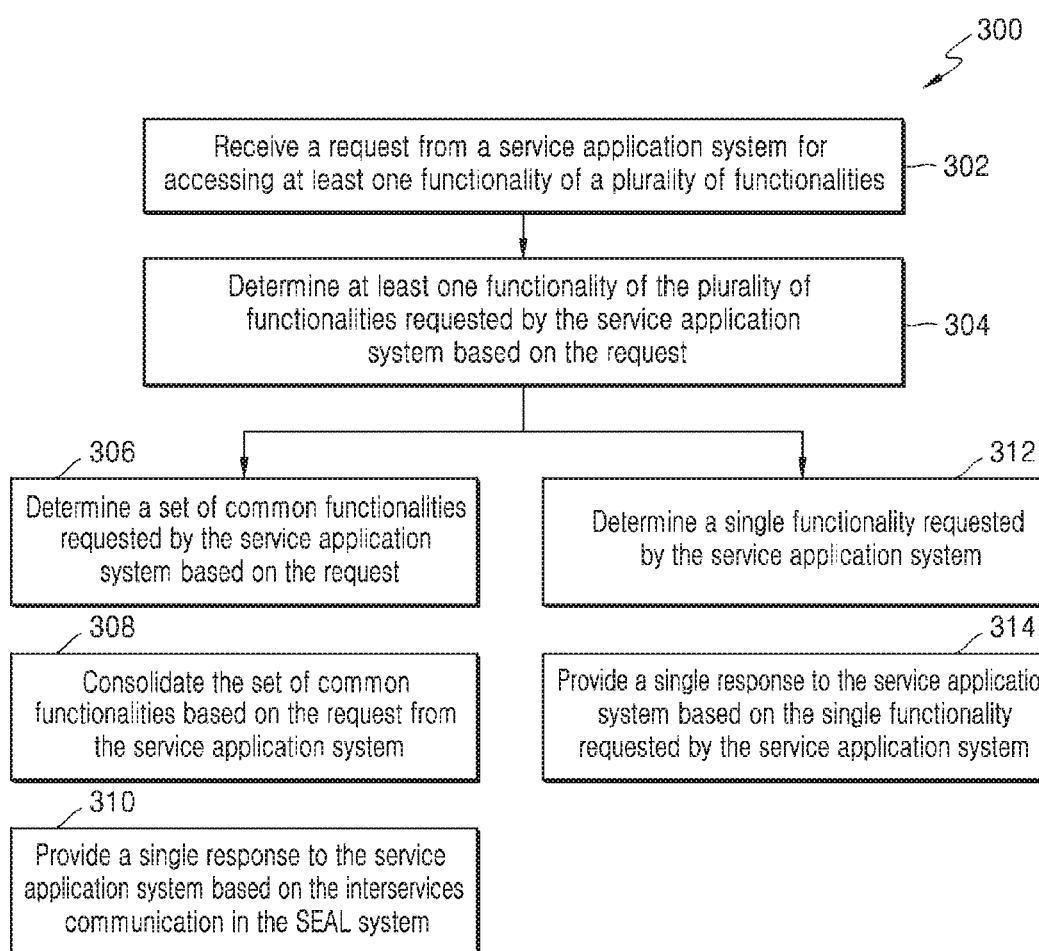
FIG. 3 is a flow chart 300 illustrating a method for provisioning inter-services communication in the SEAL system 1000 of the wireless communication network, according to an embodiment of the disclosure.

FIG. 3 is a flow chart 300 illustrating a method for provisioning inter-services communication in the SEAL system 1000 of the wireless communication network, according to an embodiment of the disclosure.

Referring to the FIG. 3, at operation 302, the SEAL function entity 100 receives the request from the service application system for accessing the at least one functionality of the plurality of functionalities. For example, in the SEAL function entity 100 as illustrated in the FIG. 2, the communicator 120 can be configured to receive the request from the service application system for accessing the at least one functionality of the plurality of functionalities.

At operation 304, the SEAL function entity 100 determines the at least one functionality of the plurality of functionalities requested by the service application system based on the request. For example, in the SEAL function entity 100 as illustrated in the FIG. 2, the processor 160 can be configured to determine the at least one functionality of the plurality of functionalities requested by the service application system based on the request.

At operation 306, the SEAL function entity 100 determines the set of common functionalities requested by the service application system based on the request. For example, in the SEAL function entity 100 as illustrated in the FIG. 2, the processor 160 can be configured to determine the set of common functionalities requested by the service application system based on the request.

At operation 308, the SEAL function entity 100 consolidates the set of common functionalities based on the request from the service application system. For example, in the SEAL function entity 100 as illustrated in the FIG. 2, the processor 160 can be configured to consolidate the set of common functionalities based on the request from the service application system.

At operation 310, the SEAL function entity 100 provides the single response to the service application system based on the inter-services communication in the SEAL system. For example, in the SEAL function entity 100 as illustrated in the FIG. 2, the processor 160 can be configured to provide the single response to the service application system based on the inter-services communication in the SEAL system.

At operation 312, the SEAL function entity 100 determines the single functionality requested by the service application system. For example, in the SEAL function entity 100 as illustrated in the FIG. 2, the processor 160 can be configured to determine the single functionality requested by the service application system.

At operation 314, the SEAL function entity 100 provides the single response to the service application system based on the single functionality requested by the service application system. For example, in the SEAL function entity 100 as illustrated in the FIG. 2, the processor 160 can be configured to provide the single response to the service application system based on the single functionality requested by the service application system.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 4:
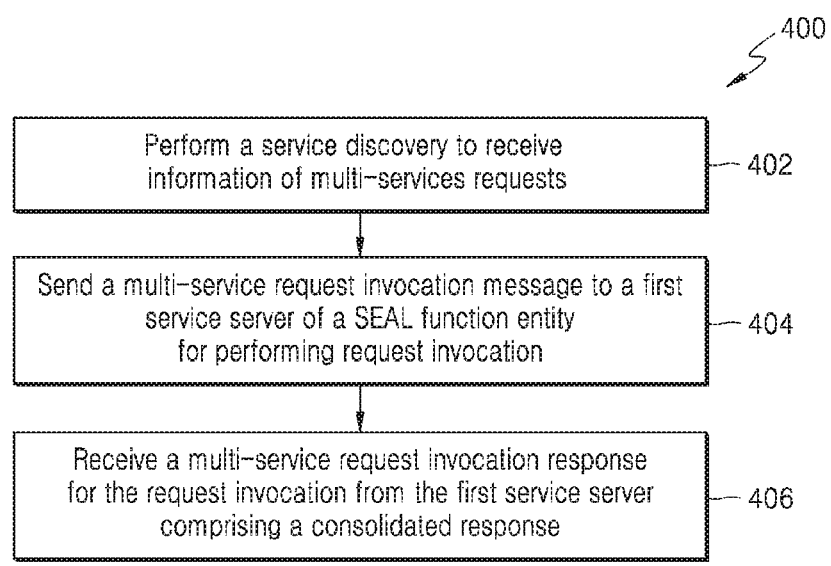
FIG. 4 is a flow chart 400 illustrating another method for provisioning inter-services communication in the SEAL system 1000 of the wireless communication network, according to an embodiment of the disclosure.

FIG. 4 is a flow chart 400 illustrating another method for provisioning inter-services communication in the SEAL system 1000 of the wireless communication network, according to an embodiment of the disclosure.

Referring to the FIG. 4, at operation 402, the SEAL function entity 100 performs the service discovery to receive information of multi-service requests. For example, in the SEAL function entity 100 as illustrated in the FIG. 2, the processor 160 can be configured to perform the service discovery to receive information of multi-service requests.

At operation 404, the SEAL function entity 100 sends the multi-service request invocation message to the first service server for performing request invocation. For example, in the SEAL function entity 100 as illustrated in the FIG. 2, the processor 160 can be configured to sends the multi-service request invocation message to the first service server for performing request invocation.

At operation 406, the SEAL function entity 100 receives the multi-service request invocation response for the request invocation from the first service server comprising the consolidated response. For example, in the SEAL function entity 100 as illustrated in the FIG. 2, the processor 160 can be configured to receive the multi-service request invocation response for the request invocation from the first service server comprising the consolidated response.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 5:
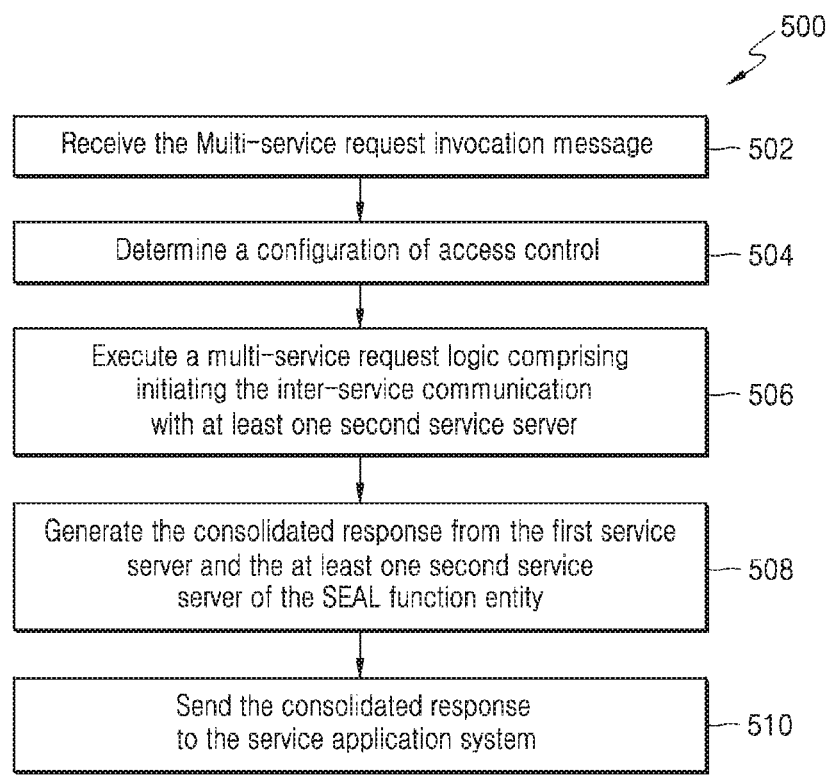
FIG. 5 is a flow chart 500 illustrating a method for generating the consolidated response in the SEAL system 1000 of the wireless communication network, according to an embodiment of the disclosure.

FIG. 5 is a flow chart 500 illustrating a method for generating the consolidated response in the SEAL system 1000 of the wireless communication network, according to an embodiment of the disclosure.

Referring to the FIG. 5, at operation 502, the SEAL function entity 100 receives the multi-service request invocation message. For example, in the SEAL function entity 100 as illustrated in the FIG. 2, the processor 160 can be configured to receive the multi-service request invocation message.

At operation 504, the SEAL function entity 100 determines the configuration of access control. For example, in the SEAL function entity 100 as illustrated in the FIG. 2, the processor 160 can be configured to determine the configuration of access control.

At operation 506, the SEAL function entity 100 executes the multi-service request logic comprising initiating the inter-service communication with at least one second service server. For example, in the SEAL function entity 100 as illustrated in the FIG. 2, the processor 160 can be configured to execute the multi-service request logic comprising initiating the inter-service communication with at least one second service server.

At operation 508, the SEAL function entity 100 generates the consolidated response from the first service server and the at least one second service server. For example, in the SEAL function entity 100 as illustrated in the FIG. 2, the processor 160 can be configured to generate the consolidated response from the first service server and the at least one second service server.

At operation 510, the SEAL function entity 100 sends the consolidated response to the service application system 300. For example, in the SEAL function entity 100 as illustrated in the FIG. 2, the communicator 120 can be configured to sends the consolidated response to the service application system 300.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 6:
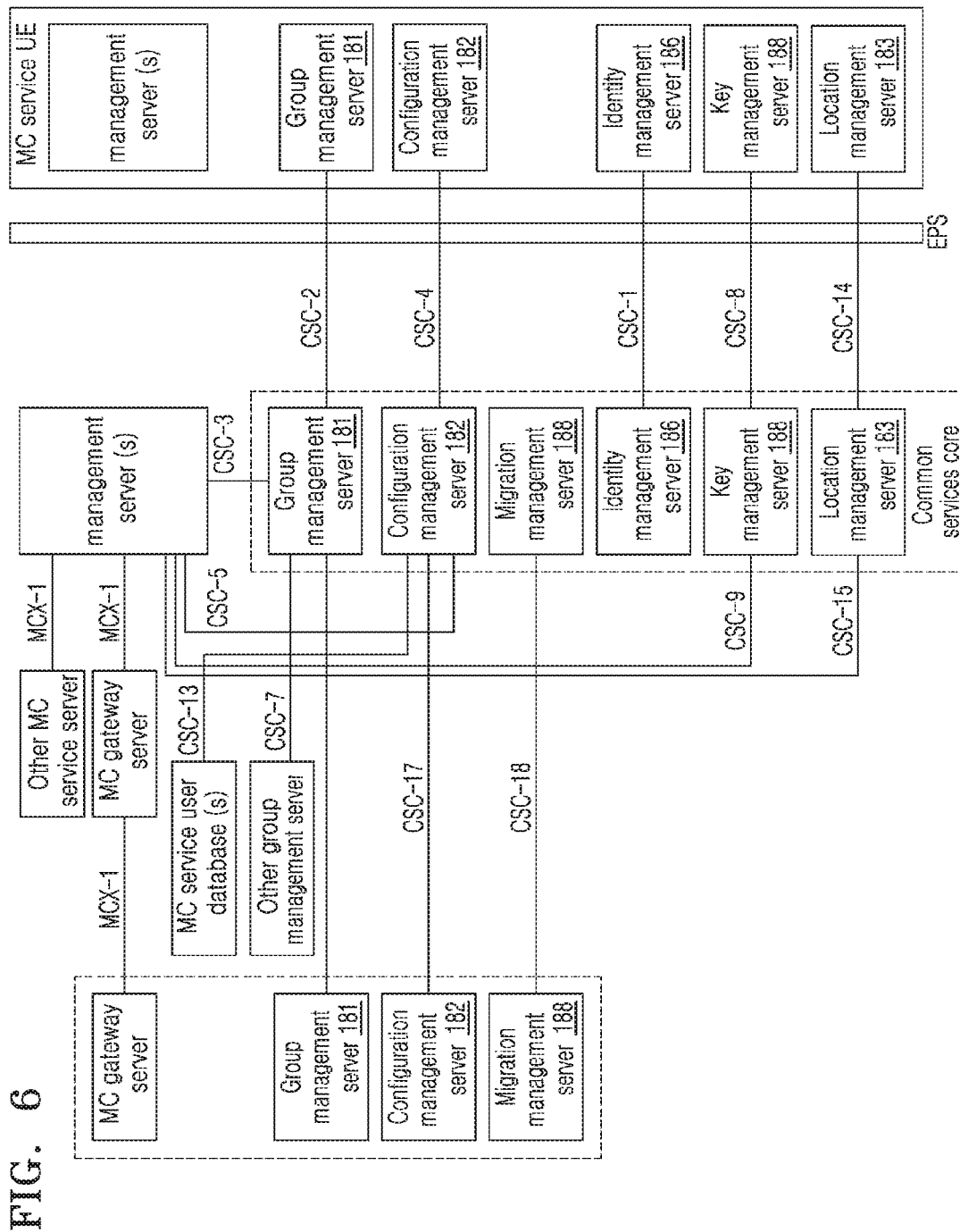
FIG. 6 illustrates architecture for application plane for a mission critical (MC) system, according to an embodiment of the disclosure.

FIG. 6 illustrates an architecture for application plane for a mission critical (MC) system, according to an embodiment of the disclosure.

Referring to FIG. 6, in a mission critical architecture, mission critical services are designed to support communication between several users of public safety community. The service provides communication modes in voice, video and data, and builds upon service enablers such as for example group communications system enabler and proximity services. The architecture of mission critical services is defined as a series of planes to allow for the breakdown of the architectural description.

Further, each plane is expected to operate in an independent manner, providing services to connected planes as and when requested by the connected plane, and requesting services from other planes as required. The various planes include application plane and the signaling control plane.

The application plane provides all services such as for example call control, floor control, video control, data control which may be required by the user together with the necessary functions to support the MC service. The application plane uses the services of the signaling control plane to support the requirements.

The signaling control plane provides the necessary signaling support to establish the association of the users involved in the MC service, such as an MCPTT call or other type of the MC services. The signaling control plane also offers access to and control of services across the MC services. The proposed method is related to the application plane architecture of mission critical services. Each mission critical service of the plurality of mission critical services can be represented by an application plane architecture.

Figure 7:
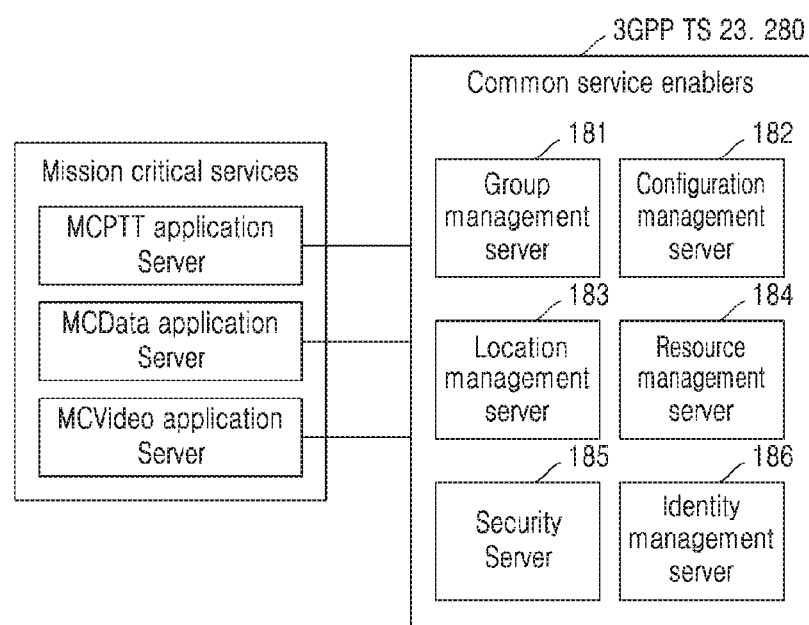
FIG. 7 illustrates a simplified architecture for the application plane of the MC system using the SEAL system 1000, according to an embodiment of the disclosure.

FIG. 7 illustrates a simplified architecture for the application plane of the MC system using the SEAL system 1000, according to an embodiment of the disclosure.

Referring to FIG. 7, based on various studies in a 3rd Generation Partnership Project (3GPP) and illustrated in both the FIG. 6 and the FIG. 7, the main service support that are expected from the MC system includes:
  a) Group management—Group creation including pre-configured and dynamic groups (e.g. based on proximity).
  b) Communication—Communication models including unicast, multicast, multiple media types, group and 1-1.
  c) Configuration—Configuration of service, user and UE parameters and access control.
  d) Identity management—Authentication and authorization of the service consumers.
  e) Security—Confidentiality and integrity of media/signaling, key management.
  f) Location—Real-time Location reporting and tracking of MC UEs.

g) Resource management—Configuration of network resources and QOS parameters required for the service.

Figure 8:
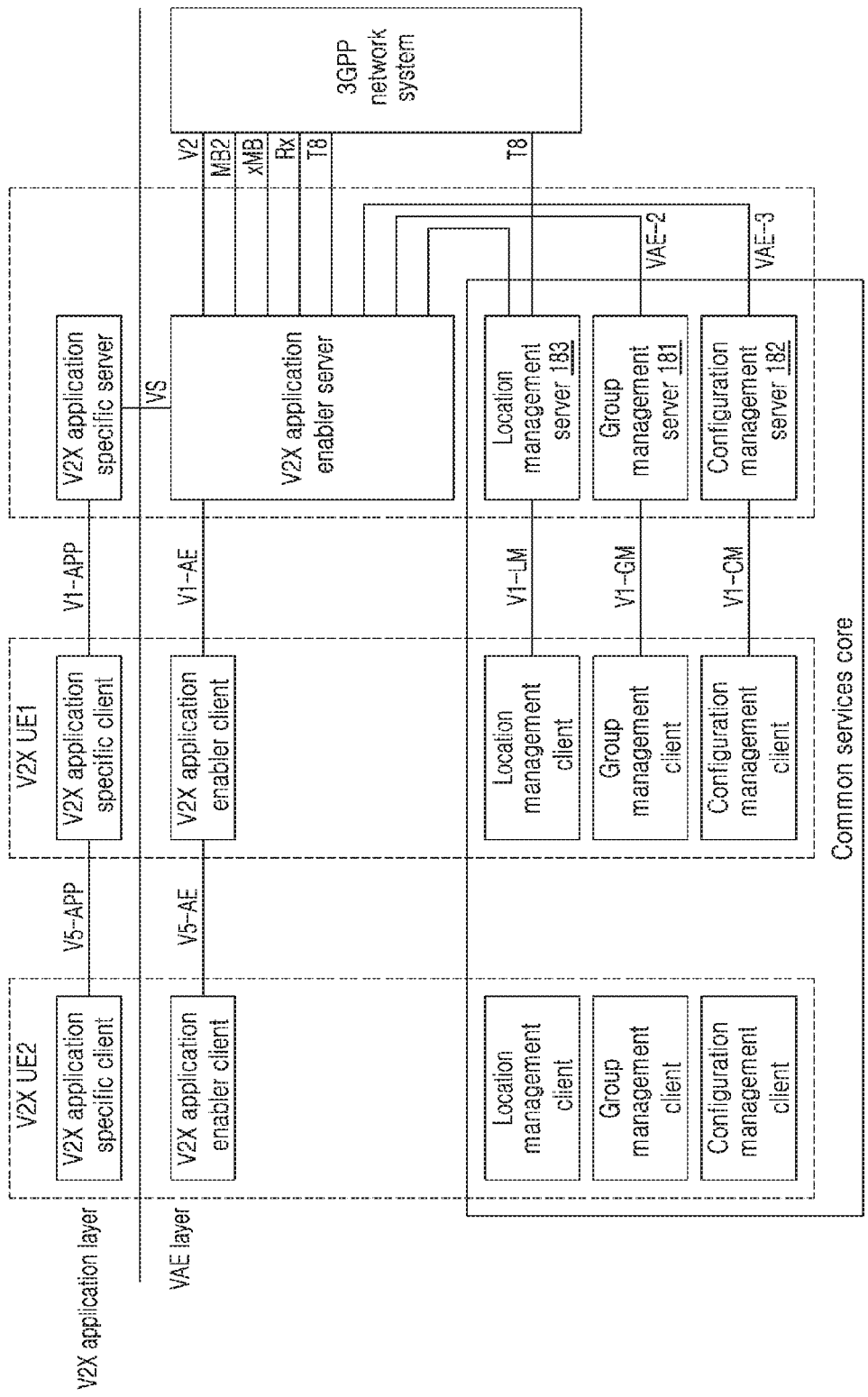
FIG. 8 illustrates a vehicle-to-everything (V2X) application layer architecture with the SEAL system 1000, according to an embodiment of the disclosure.

FIG. 8 illustrates a vehicle-to-everything (V2X) application layer architecture with the SEAL system 1000, according to an embodiment of the disclosure.

Referring to FIG. 8, the V2X is a communication service which allows the vehicles to communicate with other entities such as vehicles, pedestrians or the traffic control system. V2X communication service offers many modes of communication such as for example:

- V2V communication, or vehicle to vehicle communication (for e.g. car to car or car to bus).
- V2I communication, or vehicle to infrastructure communication (for e.g. vehicle to street light or traffic light).
- V2N communication, or vehicle to network communication (for e.g. vehicle to maps application server).
- V2P communication, vehicle to pedestrian communication.

The proposed system and method are primarily related to the application plane architecture of the V2X architecture and all other service application architecture.

Figure 9:
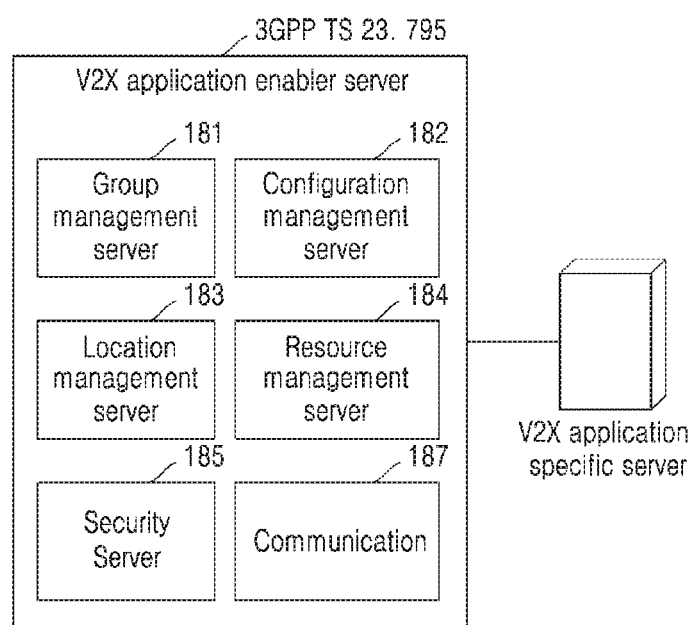
FIG. 9 illustrates a simplified representation of the SEAL system 1000 for application plane of the V2X system, according to an embodiment of the disclosure.

FIG. 9 illustrates a simplified representation of the SEAL system 1000 for application plane of the V2X system, according to an embodiment of the disclosure.

Referring to FIG. 9, based on the studies in the 3GPP and illustrated in both the FIG. 8 and the FIG. 9, the main service support that are expected from the V2X system includes:

a) Group management—Group creation (e.g. for platooning)—dynamic (e.g. based on proximity) and preconfigured.
b) Communication—Communication models—multicast, unicast, (predominantly group communication).
c) Configuration—Configuration of V2X USDs, ProSe Layer-2 Group IDs.
d) Security—Confidentiality and integrity of media/signaling between V2X UEs.
e) Location—Real-time Location reporting and tracking of V2X UEs.
f) Resource management—Configuration of network resources and QOS parameters required for e.g. level of automation.

Consider a smart factory architecture, the manufacturing industry is currently undergoing a fundamental change, which is often referred to as the "Fourth Industrial Revolution" or simply "Industry 4.0" or Industrial Internet of Things (IIoT). 3GPP TR 22.804 studied "Factories of the Future" which include application areas such as for example motion control, massive wireless sensor networks, augmented reality, process automation, connectivity for the factory floor, inbound logistics for manufacturing. 3GPP TS 22.261 has identified network capability exposure requirements to support cyber-physical control applications in vertical domains. 3GPP TR 23.734 studied the 5GS enhancements to support Vertical and LAN services, including Time Sensitive Networking, 5GLAN, Non-Public Network (NPN). Based on the studies in the 3GPP, the main service support that are expected from the smart factory system includes:

a) Discovery and selection—of the other devices online and their characteristics.
b) Group management—very low to massive number of UEs per group, dynamic addition of a UE into a specific group, UE requesting to join a specific group communications.
c) Communication—support all media types (e.g. voice, data), private and group communication, low amount of sensor data to very high data rates e.g. for video streaming of surveillance devices, indoor communication to extending with outdoor via relay, Ethernet based and WAN based, service continuity, creating and joining multicast communication.
d) Configuration—device management and onboarding of UEs, to efficiently support a range of UEs with administrative control, private network, dynamic configuration of UEs.
e) Identity—to identify an authorized UE, multicast address, traffic filtering.
f) Security—integrity protection and privacy, private communication.
g) Location—communication based on location of UEs.
h) Resource management—scaling up and down e.g. the coverage, capacity.

In unmanned aerial system (UAS) architecture, interest in using cellular connectivity to support unmanned aerial systems (UAS) is strong, and the 3GPP ecosystem offers excellent benefits for the UAS operation. Ubiquitous coverage, high reliability and quality of service (QoS), robust security, and seamless mobility are critical factors to supporting the UAS command and control functions. 3GPP TR 36.777 has studied the RAN and core enhancements required to support for aerial vehicles. Also, 3GPP TS 22.891 and 22.282 identify connectivity requirements for drones covering latency, reliability, position accuracy, flying UE aspects, Robots remote control covering latency, multiple UEs, telemetry aspects.

Based on the studies in the 3GPP, the main service support that are expected from the unmanned aerial system includes:

a) Group management—grouping of UAVs to perform specific task like coordinated surveillance.
b) Communication—Use of identity to support network-based UAS services, unmanned aerial vehicle (UAV) and the UAV(s) controller to establish the necessary connectivity between each other and with an unmanned aerial system traffic management (UTM) (considering both line of sight connectivity and non-line of sight connectivity).
c) Configuration—device management and restricting air space.
d) Identity—Initial allocation of UAS identity, Identity storage and association at the network, UAS identification and tracking would allow authorized users (for example air traffic control, public safety agencies) to query the identity and metadata of a UAV and its controller.
e) Security aspects—Airspace safety administration services based on identity, detection and reporting of unauthorized UAVs towards UTM.
f) Location—communication based on location of UAV.
g) Resource management—resources for user plane communications to carry UAV control messages.

Figure 10:
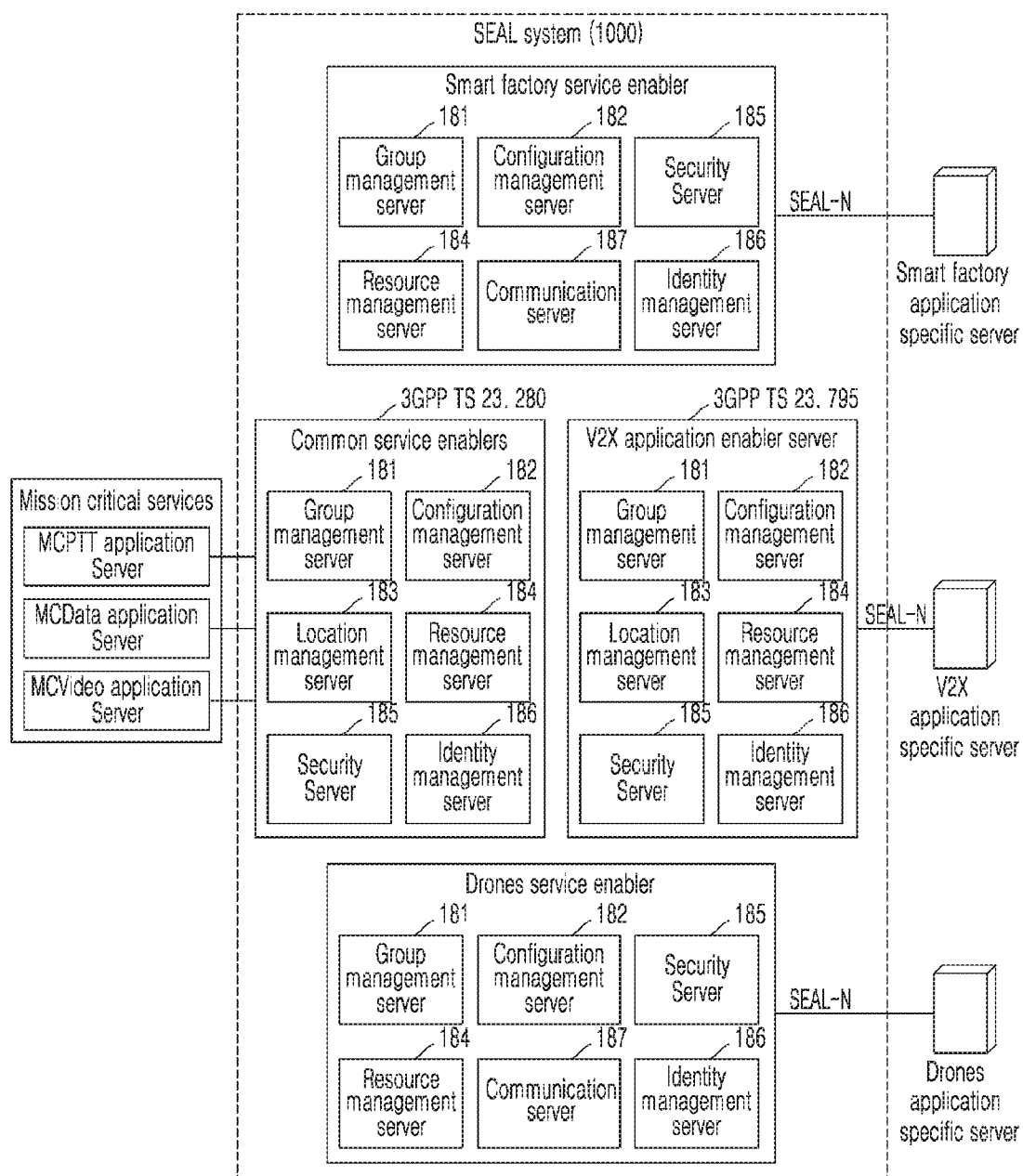
FIG. 10 illustrates fragmented service verticals architecture of the SEAL system 1000, according to an embodiment of the disclosure.

FIG. 10 illustrates fragmented service verticals architecture of the SEAL system 1000, according to an embodiment of the disclosure.

Referring to FIG. 10, it illustrates the presence of several overlapping functionalities amongst the service verticals which are fragmented and require dedicated functions in the network even for the similar requirements. The fragmentation in the SEAL system 1000 in the wireless communication network and dedicated deployments result in waste of resources resulting in increased costs which needs to be addressed. The SEAL system 1000 of isolated service verticals does not allow convergence of the common functionalities. The fragmented verticals result in increased implementation and maintenance efforts and also increased timeto-market factors. Further, the fragmented improvements in the features lead to either disparity between verticals or to duplication of efforts in each vertical. The FIG. 10 provides an overview of the fragmented approach.

The proposed SEAL system 1000 with inter-services communication enabled between the plurality of SEAL service servers 180 provides the service enabler architecture for service verticals allowing convergence of common functionalities and reuse of the SEAL service servers 180 across the service verticals. Cohesive development of the SEAL system platform will bring down cost, time and effort allowing flexibility across service verticals.

Figure 11:
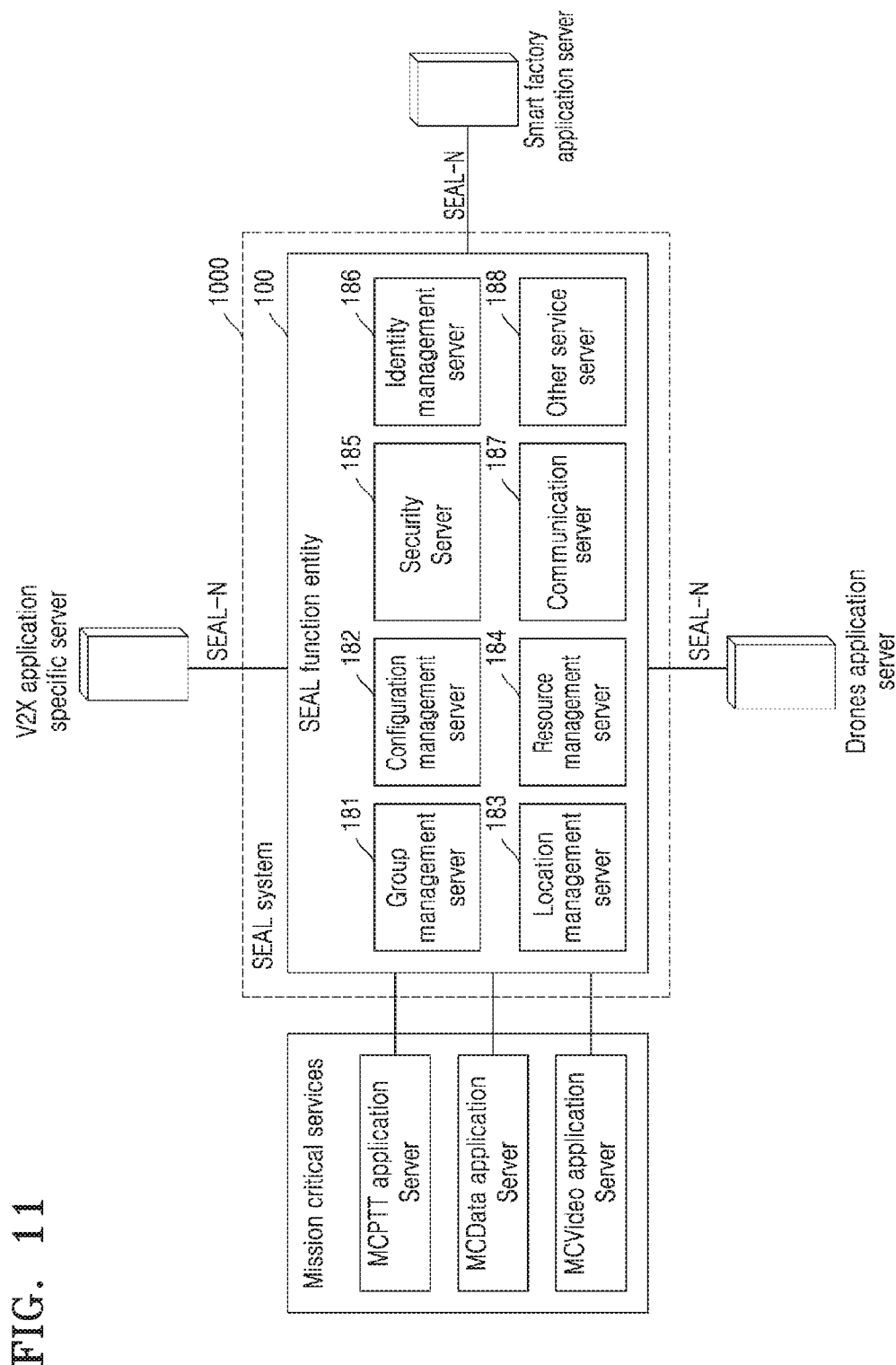
FIG. 11 illustrates the SEAL system 1000 with the inter-services communication enabled between the plurality of SEAL service servers 180, according to an embodiment of the disclosure.

FIG. 11 illustrates the SEAL system 1000 with the inter-services communication enabled between the plurality of SEAL service servers 180, according to an embodiment of the disclosure.

Referring to the FIG. 11, the SEAL system 1000 is provided with the inter-services communication enabled between the plurality of SEAL service servers 180 to overcome the problems of a fragmented approach, and to reduce the costs and efforts required to introduce new service verticals. The SEAL system 1000 provides functionalities catering to a wide range of applications with functionalities such as group management, configuration management, identity management, multimedia broadcast and multicast services, group communication, security services, location services etc. The SEAL system 1000 with the inter-services communication enabled between the plurality of SEAL service servers 180 allows cohesive development of the service verticals reducing the efforts and cost.

The SEAL system 1000 with the inter-services communication enabled between the plurality of SEAL service servers 180 provides services like:
  a) Group management: provides for management of groups supported within service vertical. In certain deployments, if needed, the group can span across service verticals. The group management functional entity can be supported using SIP, HTTP etc.
  b) Configuration management: allows management of the service and application configuration, including but not limited to device configurations, user profiles etc. The configuration management functional entity can be supported using SIP, HTTP etc.
  c) Identity management: is capability of authenticating the identities of service vertical users. It contains the knowledge and means to do authentication by verifying the credentials supplied to the service vertical.
  d) Group communication: enables the communication involving more than 2 participants. This provides the service verticals to design applications involving multiple users in the same communication.
  e) Multimedia broadcast and multicast: service allows transmission of communication in broadcast and multicast modes saving essential service vertical resources.
  f) Security and key management: entity stores and provides security related information (e.g. encryption keys) to the service vertical end users allowing confidentiality and integrity protection of communication.
  g) Location management: receives and stores user location information, and provides user location information to the service verticals.
  h) Resource management: enables the vertical users to efficiently use network resources and manage the QoS.

Further, the SEAL system 1000 may include more functionalities specific to the requirements of the service verticals being offered over the telecom network.

The SEAL system 1000 will help in reducing the implementation and maintenance efforts and allow faster time-to-market. With a centralized common architecture for service verticals, the disparity between verticals and the duplication of efforts in each vertical will be minimum. The plurality of SEAL service servers 180 may interact with each other to provide combination of functions as per the requirements of the service verticals which further reduces the implementation and service vertical development efforts.

Figure 12:
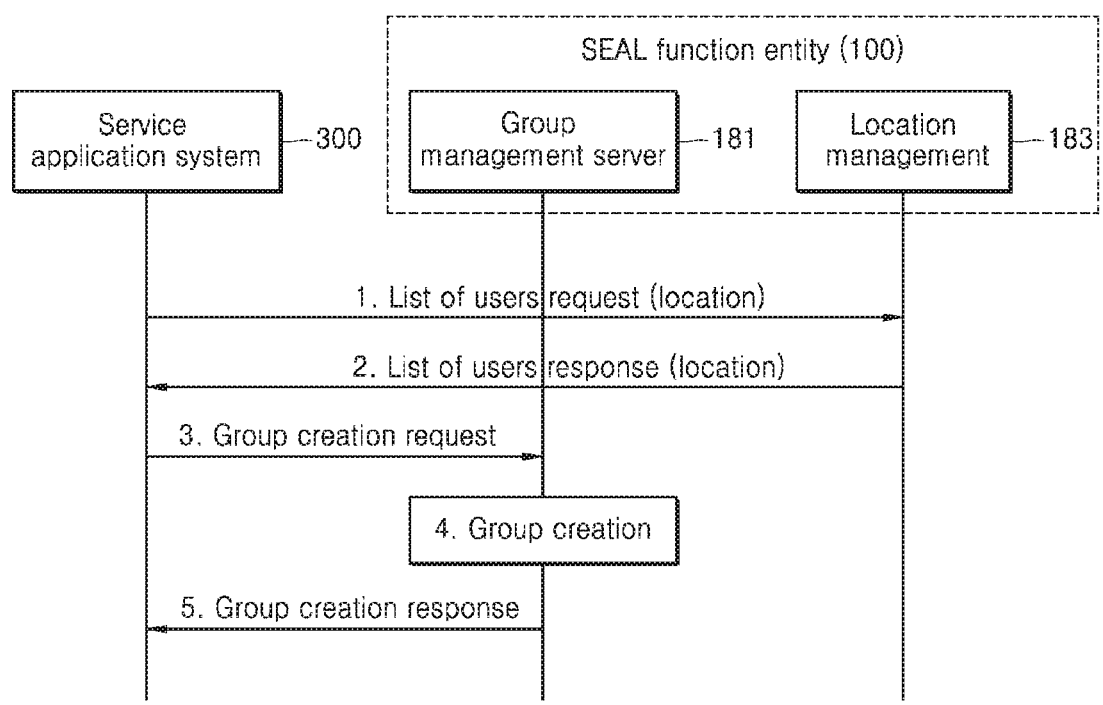
FIG. 12 is a sequence diagram illustrating an example for creation of location-based group using multiple requests, according to an embodiment of the disclosure.

FIG. 12 is a sequence diagram illustrating an example for creation of location-based group using multiple requests, according to an embodiment of the disclosure.

Referring to the FIG. 12, consider in an example, a mission critical service vertical may request creation of a group with geographic location constraints such that users in a specific geographic area only are members of the newly created group. The location-based groups can be created based on one of a single request and multiple requests to the SEAL system 1000.

Consider the creation of the location-based group using the multiple requests. At operation 1, the service application system 300 sends a group creation request (location based) to the group management server 181 of the SEAL system 1000. At operation 2, the group management server 181 of the SEAL system 1000 sends a list of users request (location) to the location management server 183. At operation 3, the location management server 183 responds by sending a list of users response (location) to the group management server 181 which comprises the list of users in the requested geographic location. Further, at operation 4, the group management server 181 creates the group comprising the users in the requested geographic location and at operation 5, the group management server 181 sends a group creation response to the service application system 300.

Figure 13:
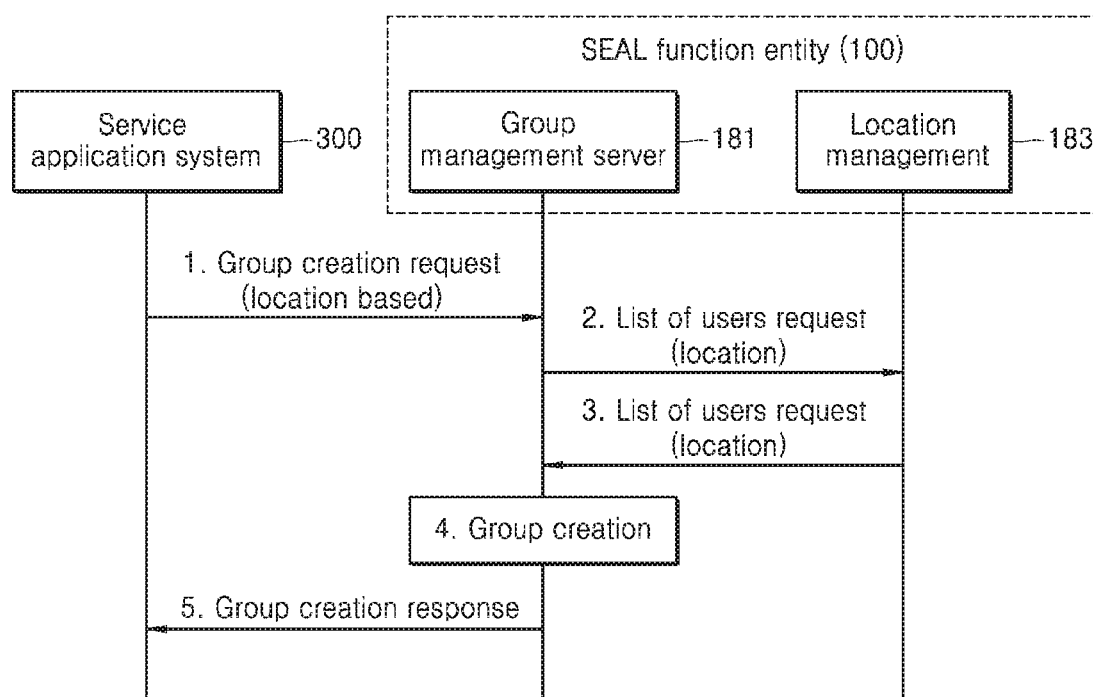
FIG. 13 is a sequence diagram illustrating an example for creation of the location-based group using a single request, according to an embodiment of the disclosure.

FIG. 13 is a sequence diagram illustrating an example for creation of the location-based group using a single request, according to an embodiment of the disclosure.

Referring to the FIG. 13, at operation 1, the service application system 300 directly requests the group management server 181 of the SEAL system to create the group of the users in a certain geographic area. At operation 2, the group management server 181 of the SEAL system 1000 sends a list of users request (location) to the location management server 183. At operation 3, the location management server 183 responds by sending a list of users response (location) to the group management server 181 which comprises the list of users in the requested geographic location. Further, at operation 4, the group management server 181 creates the group comprising the users in the requested geographic location and at operation 5, the group management server 181 sends a group creation response to the service application system 300.

Therefore, the creation of the location-based groups based on the single request from the service application system 300 reduces the development complexities of the service verticals.

FIG. 14 illustrates a reference-based representation of the SEAL system 1000, according to an embodiment of the disclosure.

Referring to FIG. 14, the SEAL function entity 100 integration with the 5GS network functions via SEAL-S interface is represented in three ways as shown in FIGS. 14-16 which includes reference-based representation of the SEAL system 1000, a service-based representation of the SEAL system 1000 and an external exposure representation of the SEAL system 1000.

Referring to the FIG. 14, the reference point representation of the SEAL system 1000 shows the interaction that exists between the entities of the SEAL function entity 1000 and the 5GS functions described by point-to-point reference point.

FIG. 15 illustrates a service-based representation of the SEAL system 1000, according to an embodiment of the disclosure.

Referring to the FIG. 15, the service-based representation, where the SEAL system 1000 is implemented as an application function (AF) and the SEAL system 1000 interacts with the authorized network functions of the 5GS to access the services of the 5GS network.

FIG. 16 illustrates an external exposure representation of the SEAL system 1000, according to an embodiment of the disclosure.

Referring to FIG. 16, the external exposure representation, where the SEAL system 1000 is implemented as a 3rd party application and interacts with the 5GS via network exposure function (NEF), as illustrated in FIG. 1.

In SEAL system 1000 deployment models, several deployment scenarios are possible in the way that the SEAL system 1000 can be deployed in different situations. For example, the SEAL system 1000 can be deployed within the Public Land Mobile Network (PLMN) trust domain or outside the PLMN trust domain. Also, the SEAL system 1000 can be centrally deployed or the SEAL system 1000 can be deployed at the edge. Different deployment scenarios can be realized that requires variations of the SEAL-N and SEAL-S interfaces.

For the SEAL system 1000 residing outside the PLMN trust domain, the SEAL system 1000 can be offered by the 3rd party residing outside of the PLMN trust domain where the 3rd party has business relationship with the PLMN provider for utilizing the PLMN offered capabilities. In such deployment model, the SCEF or NEF exposure of the 3GPP network service capabilities is used by the 3rd party implemented the SEAL system 1000 as SCS AS i.e. SEAL-N implements T8 or N33 interface for SCEF or NEF respectively. This allows one SEAL system 1000 to be deployed and utilized by different verticals across multiple PLMNs.

In SEAL system 1000 at the edge, the edge computing allows service verticals to be hosted on the edge of the telecom network, close to the access point of the user's device. This results in an efficient service throughput, resulting due to the reduced end-to-end latency and bypassing of the load on the transport network.

The SEAL system 1000 can also be provided over the edge of the telecom network, hosted on a local data network and the user plane traffic can be directed towards the local data network.

Figure 17:
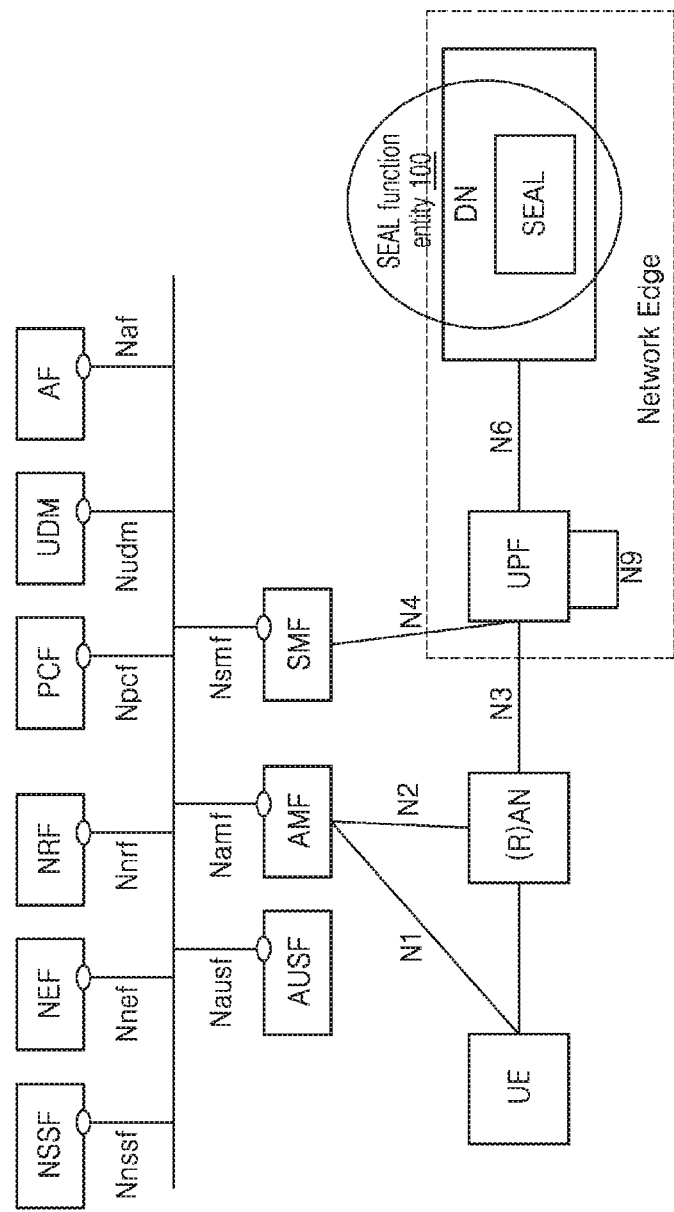
FIG. 17 illustrates a deployment of the SEAL system 1000 over the network edge, according to an embodiment of the disclosure.

FIG. 17 illustrates a deployment of the SEAL system 1000 over the network edge, according to an embodiment of the disclosure.

Referring to the FIG. 17, when deployed over the edge in the 5G network the SEAL system 1000 is deployed in a local data network on edge, connected to a User Plane Function via a N6 interface. Further the SEAL system 1000 can connect to the 5G core via the network exposure function, if the SEAL system 100 is not a trusted network entity. If the SEAL system 1000 is a trusted entity, then the SEAL system 1000 can directly connect to the service-based architecture of the 5G Core Network.

The plurality of UEs in the telecom networks are inherently mobile, allowing the users to move geographically while the coverage of the edge is restricted. This makes the applications requiring service continuity while running on edge exposed to the UE's mobility. This needs to be handled by the application logic.

When deployed over the edge, certain functionalities provided by the SEAL system 1000 also require mobility handling, such as group communication. Context of the group communication started within one edge should be handled and transferred to another edge depending on the mobility of the plurality of UEs.

One example would be a platooning group in the V2X service vertical initiating group communication using the SEAL system 1000 hosted on the edge. With the mobility of the platooning group, the SEAL system 1000 and the V2X service vertical needs to work in tandem to provide seamless mobility of the group communication from one edge to the next.

Figure 18:
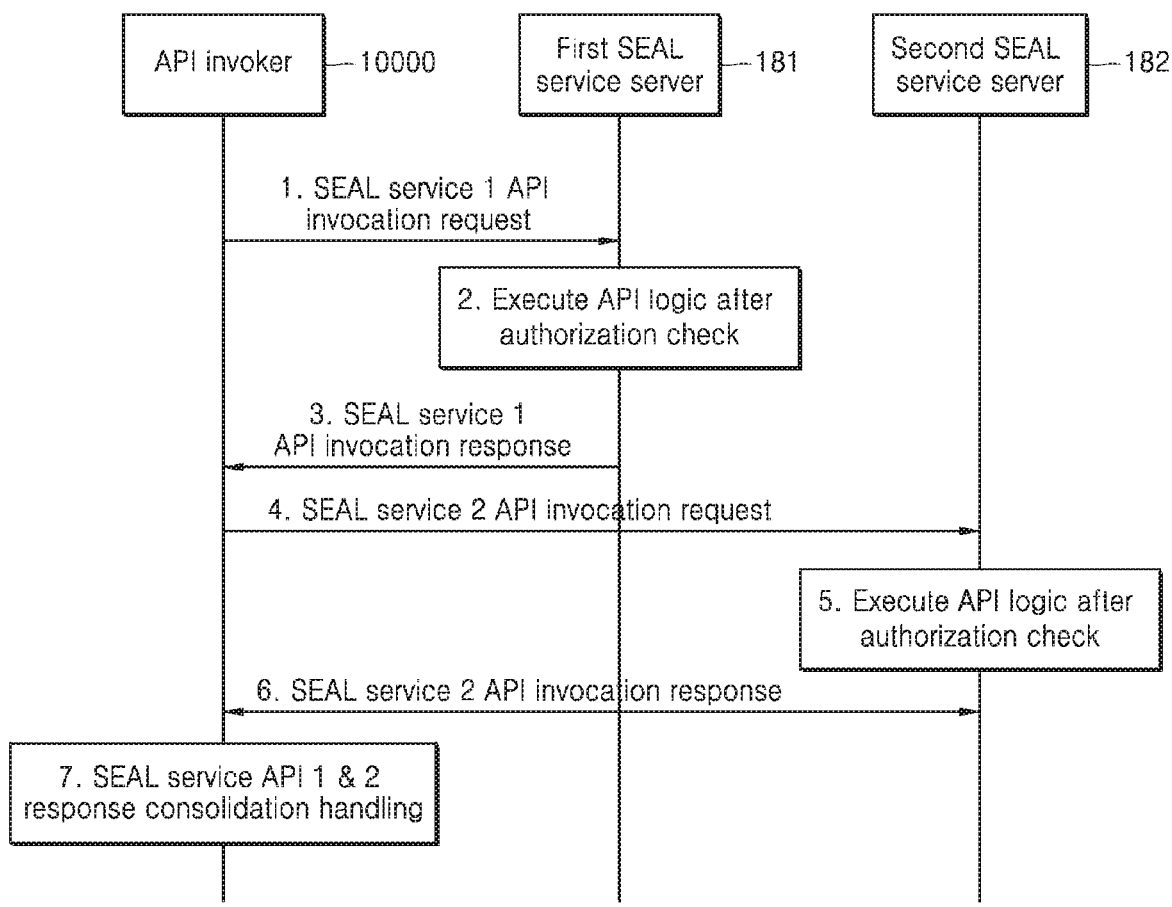
FIG. 18 illustrates an interaction with the SEAL system 1000 without the inter-service communication enabled between the plurality of SEAL service servers 180, according to an embodiment of the disclosure.

FIG. 18 illustrates an interaction with the SEAL system 1000 without the inter-service communication enabled between the plurality of SEAL service servers (180), according to an embodiment of the disclosure.

Referring to FIG. 18, the SEAL system 1000 in 3GPP TS 23.434 v0.1.0 assumes that each SEAL service (example: provided by the first SEAL server) is independent of another SEAL service (example: provided by the second SEAL server). However, the vertical industry application also has requirements to utilize a combination of two or more SEAL services. For example, vertical industry application may require forming a location-based group, to broadcast messages to a certain area. The FIG. 18 depicts a method wherein the vertical industry applications utilize a combination of two or more SEAL services without inter-service communication. An API invoker 10000 could be a VAL server or the SEAL client(s).

A set of pre-conditions for providing combination of two or more SEAL services without inter-service communication enabled between the plurality of SEAL service servers 180:

a) The API invoker 10000 needs to perform the service discovery and receive the details of the SEAL service 1 and SEAL service 2 APIs which includes the information about the service communication entry point corresponding to the service APIs.

b) The API invoker 10000 is authenticated and authorized to use the SEAL service 1 and SEAL service 2 APIs.

The procedure for obtaining the combination of two or more SEAL services without inter-service communication is:

1. Operation-1: the API invoker 10000 performs API invocation by sending a SEAL service 1 API invocation request towards the first SEAL service server 181 which exposes the SEAL service 1 API, and acts as an access control entity.

2. Operation-2: Upon receiving the SEAL service 1 API invocation request from the API invoker 10000, the SEAL service 1 server checks for the configuration of access control. As per the configuration for access control, the SEAL service 1 server performs access control on the service API invocation as per the policy and executes the API logic.

3. Operation-3: The API invoker 10000 receives a SEAL service 1 API invocation response for the service API invocation from the SEAL service 1 server the service API.

4. Operations-4, 5, 6: Corresponding operations 1, 2, 3 are applicable respectively, where the API invoker 10000 is performing SEAL service 2 API invocation towards the second SEAL service server which exposes the SEAL service 2 API, and acts as the access control entity.
5. Operation-7: Since the vertical industry application has requirement to utilize a combination of two or more SEAL services, the API invoker 10000 handles the consolidation of the two responses, SEAL service 1 API invocation response and SEAL service 2 API invocation response.

Therefore, in case of the vertical industry application requirement of forming the location-based group, the API invoker 10000 invokes two SEAL service servers separately and then the API invoker 10000 consolidates the result from the responses received independently from the two SEAL service servers which might increase the processing time due to the increased number of operations.

FIG. 19 illustrates architecture of the SEAL system 1000 with the inter-service communication enabled between the plurality of SEAL service servers 180, according to an embodiment of the disclosure.

Referring to FIG. 19, although each of the SEAL service servers 181-188 of the plurality of SEAL service servers 180 can be interfaced to VAL server (s) and SEAL client(s) separately, the same is intentionally not shown in the FIG. 19 to illustrate the benefit of the inter-service communication between the plurality of servers 180. The communication between the plurality of SEAL service servers 180 with each other is known as SEAL inter-service communication which is provided via SEAL-X interface. The SEAL-X interface is normally used at the time of executing the API logic at one SEAL service server to communicate with the other SEAL service server(s). SEAL-X interface can be an extension to the SEAL-E interface. The SEAL inter-service communication can be implemented as Remote procedure calls (RPCs) or as Application programming interfaces (APIs). Each of the SEAL service servers register their available APIs to the CAPIF core function (CCF) entity 2000 via CAPIF-3/4/5 interfaces as specified in 3GPP TS 23.222. The API invoker 10000 which could be the VAL server or the SEAL client(s), discover service APIs by communicating with the CCF entity 2000 via CAPIF-1/1e interface as specified in 3GPP TS 23.222. Further, the VAL server(s) communicate with the SEAL server(s) over the SEAL-A reference points, which is an instance of CAPIF-2/2e interfaces as specified in 3GPP TS 23.222.

Figure 20:
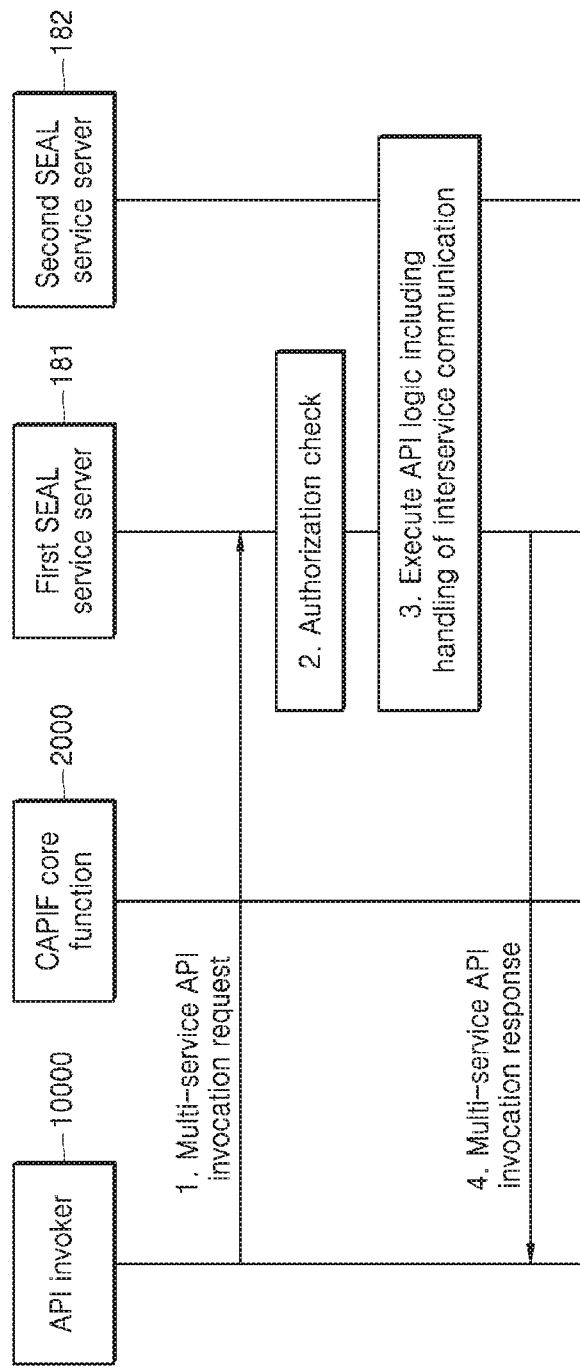
FIG. 20 illustrates an interaction with the SEAL system 1000 with the inter-service communication enabled between the plurality of SEAL service servers 180 in order to implement and register a multi-service API to a CCF entity 2000, according to an embodiment of the disclosure.

FIG. 20 illustrates an interaction with the SEAL system 1000 with the inter-service communication enabled between the plurality of SEAL service servers 180 in order to implement and register a multi-service API to the CCF entity 2000, according to an embodiment of the disclosure.

Referring to FIG. 20, a set of pre-conditions for providing combination of two or more SEAL services with the inter-service communication enabled between the plurality of SEAL service servers 180 include:
1. The first SEAL service server 181 and the second SEAL service server 182 has implemented specific service APIs that can be exposed to the API invokers via the CCF entity 2000.
2. Operation-1: The second SEAL service server 182 has enabled inter-service communication for the first SEAL service server 181.
3. Operation-2: The second SEAL service server 182 has registered its service APIs including the service API information to the CCF entity 2000.
4. Operation-3: The first SEAL service server 181 discovers the service APIs including those registered by the second SEAL service server 182.
5. Operation-4: The first SEAL service server 181 obtains the necessary credentials to access the service API exposed by the second SEAL service server 182.
6. Operation-5: The first SEAL service server 181 implements the API combining the API logic from its own exposed service API and the service API exposed by the second SEAL service server 182, known as multi-service API.
7. Operation-6: The first SEAL service server 181 registers the new multi-service API to the CCF entity 2000, which would then be available for the API invokers 10000 of the vertical industry applications to utilize.

Figure 21:
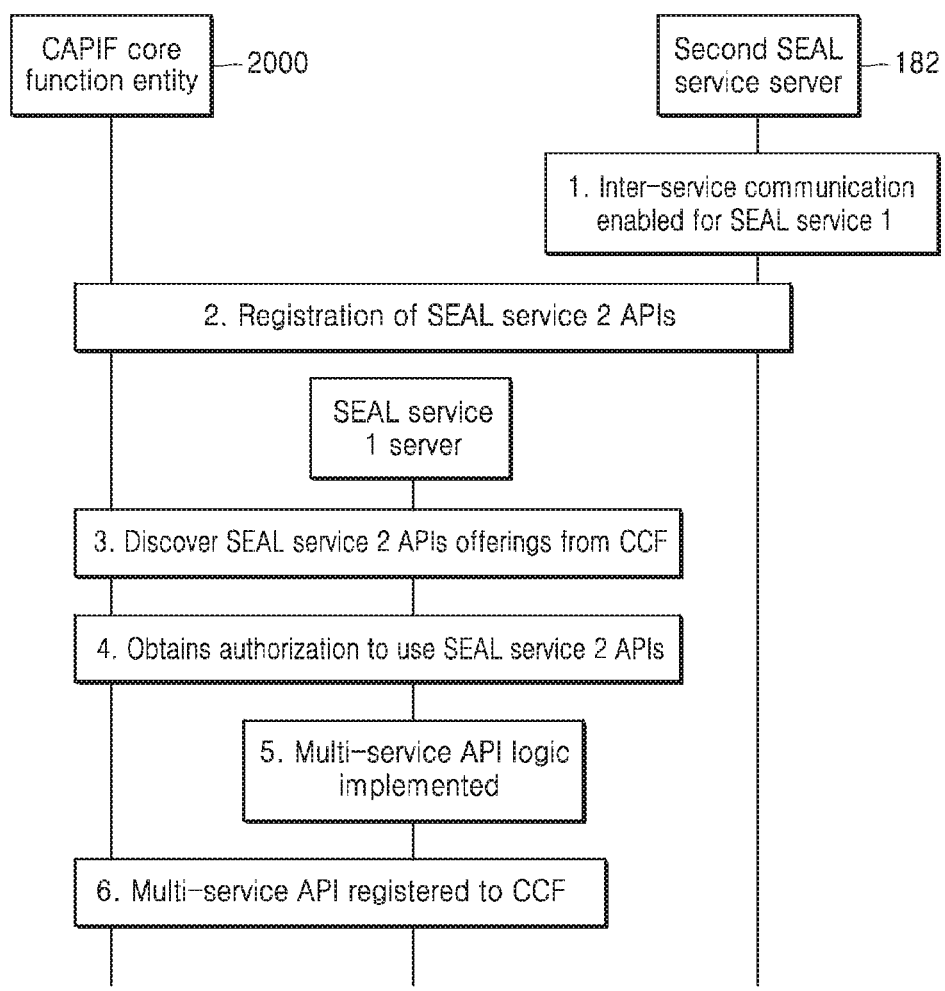
FIG. 21 illustrates an example scenario of the vertical industry applications utilizing the combination of two or more SEAL services with the inter-service communication enabled between the plurality of SEAL service servers 180, according to an embodiment of the disclosure.

FIG. 21 illustrates an example scenario of the vertical industry applications utilizing the combination of two or more SEAL services with the inter-service communication enabled between the plurality of SEAL service servers 180, according to an embodiment of the disclosure.

Referring to FIG. 21, the API invoker 10000 could be the VAL server or the SEAL client(s).

A set of pre-conditions for providing combination of two or more SEAL services with the inter-service communication enabled between the plurality of SEAL service servers 180 include:
1. The SEAL service 2 server has enabled inter-service communication for SEAL service 1 server.
2. The SEAL service 1 server has registered a multi-service API to the CCF, involving the inter-service communication between SEAL service 1 server and SEAL service 2 server.
3. The API invoker 10000 has performed the service discovery and received the details of the SEAL service 1 APIs including the multi-service APIs.
4. The API invoker 10000 is authenticated and authorized to use the SEAL service 1 APIs.

At Operation-1: The API invoker 10000 performs the API invocation by sending a Multi-service API invocation request towards the SEAL service 1 server 181, which acts as access control entity. Further, at operation-2: Upon receiving the Multi-service API invocation request from the API invoker 10000, the SEAL service 1 server checks for the configuration of access control. As per the configuration of access control, the SEAL service 1 server performs access control on the service API invocation.

At operation-3: The SEAL service 1 server 181 executes the multi-service API logic, including initiating the necessary inter-service communication with the SEAL service 2 server 182, to form a consolidated response from the SEAL service 1 and SEAL service 2 APIs. At operation-4 the API invoker 10000 receives a multi-service API invocation response for the service API invocation from the SEAL service 1 server 181 including a consolidated response. Therefore, in case of the vertical industry application requirement of forming a location-based group, the API invoker 10000 has to invoke only one SEAL service server which then takes care of the inter-service communication with the other SEAL service servers of the SEAL system 1000 and provides the consolidated result as a response.

Figure 22:
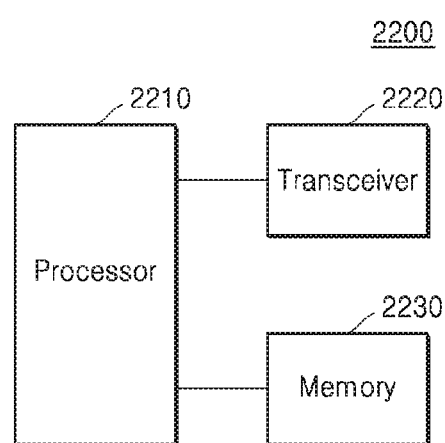
FIG. 22 is a block diagram illustrating a network entity according to an embodiment of the disclosure.

FIG. 22 is a block diagram illustrating a network entity 2200 according to an embodiment of the disclosure.

The base stations, eNBs, gNBs, servers, network function entities, function entities (e.g., SEAL function entity 100) and 5GCN network function entities described above may correspond to the network entity 2200.

Referring to the FIG. 22, the network entity 2200 may include a processor 2210, a transceiver 2220 and a memory 2230. However, all of the illustrated components are not essential. The network entity 2200 may be implemented by more or less components than those illustrated in FIG. 22. In addition, the processor 2210 and the transceiver 2220 and the memory 2230 may be implemented as a single chip according to another embodiment.

The aforementioned components will now be described in detail.

The processor 2210 may include one or more processors or other processing devices that control the proposed function, process, and/or method. Operation of the network entity 2200 may be implemented by the processor 2210.

The transceiver 2220 may include a RF transmitter for up-converting and amplifying a transmitted signal, and a RF receiver for down-converting a frequency of a received signal. However, according to another embodiment, the transceiver 2220 may be implemented by more or less components than those illustrated in components.

The transceiver 2220 may be connected to the processor 2210 and transmit and/or receive a signal. The signal may include control information and data. In addition, the transceiver 2220 may receive the signal through a wireless channel and output the signal to the processor 2210. The transceiver 2220 may transmit a signal output from the processor 2210 through the wireless channel.

The memory 2230 may store the control information or the data included in a signal obtained by the network entity 2200. The memory 2230 may be connected to the processor 2210 and store at least one instruction or a protocol or a parameter for the proposed function, process, and/or method. The memory 2230 may include read-only memory (ROM) and/or random-access memory (RAM) and/or hard disk and/or CD-ROM and/or DVD and/or other storage devices.

Figure 23:
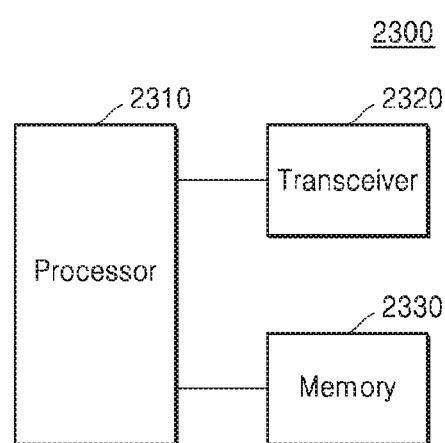
FIG. 23 is a block diagram illustrating a user equipment according to an embodiment of the disclosure.

FIG. 23 is a block diagram illustrating a UE 2300 according to an embodiment of the disclosure.

The UEs described above may correspond to the UE 2300.

Referring to the FIG. 23, the UE 2300 may include a processor 2310, a transceiver 2320 and a memory 2330. However, all of the illustrated components are not essential. The UE 2300 may be implemented by more or less components than those illustrated in FIG. 23. In addition, the processor 2310 and the transceiver 2320 and the memory 2330 may be implemented as a single chip according to another embodiment.

The aforementioned components will now be described in detail.

The processor 2310 may include one or more processors or other processing devices that control the proposed function, process, and/or method. Operation of the UE (2300) may be implemented by the processor 2310.

The processor 2310 may detect a PDCCH on a configured control resource set. The processor 2310 determines a method for dividing CBs and a method for rate matching of a PDSCH according to the PDCCH. The processor 2310 may control the transceiver 2320 to receive the PDSCH according to the PDCCH. The processor 2310 may generate HARQ-ACK information according to the PDSCH. The processor 2310 may control the transceiver 2320 to transmit the HARQ-ACK information.

The transceiver 2320 may include a RF transmitter for up-converting and amplifying a transmitted signal, and a RF receiver for down-converting a frequency of a received signal. However, according to another embodiment, the transceiver 2320 may be implemented by more or less components than those illustrated in components.

The transceiver 2320 may be connected to the processor 2310 and transmit and/or receive a signal. The signal may include control information and data. In addition, the transceiver 2320 may receive the signal through a wireless channel and output the signal to the processor 2310. The transceiver 2320 may transmit a signal output from the processor 2310 through the wireless channel.

The memory 2330 may store the control information or the data included in a signal obtained by the UE 2300. The memory 2330 may be connected to the processor 2310 and store at least one instruction or a protocol or a parameter for the proposed function, process, and/or method. The memory 2330 may include read-only memory (ROM) and/or random-access memory (RAM) and/or hard disk and/or CD-ROM and/or DVD and/or other storage devices.

Figure 24:
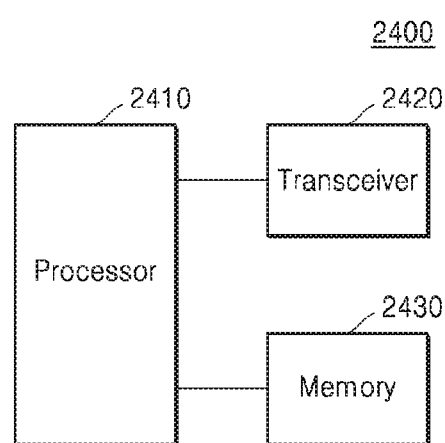
FIG. 24 is a block diagram illustrating a service application server according to an embodiment of the disclosure.

FIG. 24 illustrates a block diagram illustrating a service application server 2400 according to an embodiment of the disclosure.

The service application server 2400 may be included in the service application system 300. Or, the service application server 2400 itself may correspond to the service application system 300.

Referring to the FIG. 24, the service application server 2400 may include a processor 2410, a transceiver 2420 and a memory 2430. However, all of the illustrated components are not essential. The service application server 2400 may be implemented by more or less components than those illustrated in FIG. 24. In addition, the processor 2410 and the transceiver 2420 and the memory 2430 may be implemented as a single chip according to another embodiment.

The aforementioned components will now be described in detail.

The processor 2410 may include one or more processors or other processing devices that control the proposed function, process, and/or method. Operation of the service application server 2400 may be implemented by the processor 2410.

The transceiver 2420 may include a RF transmitter for up-converting and amplifying a transmitted signal, and a RF receiver for down-converting a frequency of a received signal. However, according to another embodiment, the transceiver 2420 may be implemented by more or less components than those illustrated in components.

The transceiver 2420 may be connected to the processor 2410 and transmit and/or receive a signal. The signal may include control information and data. In addition, the transceiver 2420 may receive the signal through a wireless channel and output the signal to the processor 2410. The transceiver 2420 may transmit a signal output from the processor 2410 through the wireless channel.

The memory 2430 may store the control information or the data included in a signal obtained by the service application server 2400. The memory 2430 may be connected to the processor 2410 and store at least one instruction or a protocol or a parameter for the proposed function, process, and/or method. The memory 2430 may include read-only memory (ROM) and/or random-access memory (RAM) and/or hard disk and/or CD-ROM and/or DVD and/or other storage devices.

The various actions, acts, blocks, operations, or the like in the method may be performed in the order presented, in a different order or simultaneously. Further, in some embodiments, some of the actions, acts, blocks, operation, or the like may be omitted, added, modified, skipped, or the like without departing from the scope of the disclosure.

While the disclosure has been shown and described with reference to various embodiments thereof, it will be understood by those skilled in the art that various changes in form

What is claimed is:

1. A method of providing service enabler architecture layer (SEAL) service performed by a SEAL server, the method comprising:
receiving, from service application server, request for accessing at least two SEAL service functionalities;
based on the request for accessing at least two SEAL service functionalities, transmitting, to another SEAL server, request for accessing SEAL service functionality provided by the other SEAL server;
receiving, from the other server, response for accessing the SEAL service functionality provided by the other SEAL server;
based on the response, generating consolidated response for accessing at least two SEAL service functionalities; and
transmitting, to the service application server, the consolidated response.

2. The method of claim 1, wherein the SEAL service functionality comprises at least one of:
location management,
group management,
configuration management,
identity management,
key management, or
network resource management.

3. The method of claim 1, wherein the SEAL server interacts with the other SEAL server for inter-service communication.

4. The method of claim 1, in case that the SEAL server is group management server and the other SEAL server is location management server,
wherein the request for accessing at least two SEAL service functionalities comprises location based group creation request,
wherein the request for accessing the SEAL service functionality provided by the other SEAL server comprises UEs list per location request,
wherein the response for accessing the SEAL service functionality provided by the other SEAL server comprises UEs list per location request response, and
wherein the consolidated response comprises location based group creation.

5. The method of claim 1, wherein the SEAL server is integrated with a 5GC network exposure function (NEF) entity.

6. The method of claim 1, wherein the service application server comprises at least one of:
SEAL client, or
vertical application layer (VAL) server.

7. The method of claim 3, wherein the SEAL server interacts with the other SEAL server via SEAL-X interface.

8. The method of claim 7, wherein the SEAL-X interface comprises providing interaction between a group management server and a location management server.

9. An apparatus of providing service enabler architecture layer (SEAL) service, the apparatus comprising:
a memory;
a transceiver; and
a processor coupled with the memory and the transceiver, the processor configured to:
receive, from service application server, request for accessing at least two SEAL service functionalities,
based on the request for accessing at least two SEAL service functionalities, transmit, to another SEAL server, request for accessing SEAL service functionality provided by the other SEAL server,
receive, from the other server, response for accessing the SEAL service functionality provided by the other SEAL server,
based on the response, generate consolidated response for accessing at least two SEAL service functionalities, and
transmit, to the service application server, the consolidated response.

10. The apparatus of claim 9, wherein the SEAL service comprises functionality at least one of:
location management,
group management,
configuration management,
identity management,
key management, or
network resource management.

11. The apparatus of claim 9, wherein the apparatus interacts with the other SEAL server for inter-service communication.

12. The apparatus of claim 9, in case that the SEAL server is group management server and the other SEAL server is location management server,
wherein the request for accessing at least two SEAL service functionalities comprises location based group creation request,
wherein the request for accessing the SEAL service functionality provided by the other SEAL server comprises UEs list per location request,
wherein the response for accessing the SEAL service functionality provided by the other SEAL server comprises UEs list per location request response, and
wherein the consolidated response comprises location based group creation.

13. The apparatus of claim 9, wherein the apparatus is integrated with a 5GC network exposure function (NEF) entity.

14. The apparatus of claim 9, wherein the service application server comprises at least one of:
SEAL client, or
vertical application layer (VAL) server.

15. The apparatus of claim 11, wherein the SEAL server interacts with the other SEAL server via SEAL-X interface.

16. The apparatus of claim 15, wherein the SEAL-X interface comprises providing interaction between a group management server and a location management server.

* * * * *